United States Patent
Zhang

(10) Patent No.: US 11,115,672 B2
(45) Date of Patent: Sep. 7, 2021

(54) VIDEO ENCODING METHOD AND APPARATUS, VIDEO DECODING METHOD AND APPARATUS, COMPUTER DEVICE, AND STORAGE MEDIUM

(71) Applicant: Tencent Technology (Shenzhen) Company Limited, Shenzhen (CN)

(72) Inventor: Tao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/074,482

(22) Filed: Oct. 19, 2020

(65) Prior Publication Data

US 2021/0037253 A1 Feb. 4, 2021

Related U.S. Application Data

(63) Continuation of application No. PCT/CN2019/109972, filed on Oct. 8, 2019.

(30) Foreign Application Priority Data

Oct. 15, 2018 (CN) .......................... 201811197962.5

(51) Int. Cl.
*H04N 19/50* (2014.01)
*H04N 19/136* (2014.01)
*H04N 19/149* (2014.01)
*H04N 19/176* (2014.01)
*H04N 19/182* (2014.01)
*H04N 19/124* (2014.01)

(52) U.S. Cl.
CPC .......... *H04N 19/50* (2014.11); *H04N 19/136* (2014.11); *H04N 19/149* (2014.11);
(Continued)

(58) Field of Classification Search
CPC .... H04N 19/50; H04N 19/136; H04N 19/149; H04N 19/176; H04N 19/182;
(Continued)

(56) References Cited

U.S. PATENT DOCUMENTS

2015/0245072 A1   8/2015   Chen et al.
2017/0223373 A1   8/2017   Ugur et al.
(Continued)

FOREIGN PATENT DOCUMENTS

CN    102215392 A    10/2011
CN    102695061 A    9/2012
(Continued)

OTHER PUBLICATIONS

Tencent Technology, WO, PCT/CN2019/109972, dated Dec. 27, 2019, 5 pgs.
(Continued)

*Primary Examiner* — Nam D Pham
(74) *Attorney, Agent, or Firm* — Morgan, Lewis & Bockius LLP

(57) ABSTRACT

This application relates to a video encoding method performed at a computer device. The computer device obtains a current encoding block to be encoded in a current video frame, the current encoding block having a width and a height different from the width. The computer device determines, within the current video frame, target reference pixels corresponding to the current encoding block, a target quantity corresponding to the target reference pixels being the e-th power of one of the width and the height under a target numeral system, e being a positive integer, the target numeral system being a numeral system used for calculating a predicted value of the current encoding block. After obtaining a predicted value corresponding to the current encoding block according to the target reference pixels, the computer device performs video encoding on the current encoding block according to the predicted value, to obtain encoded data.

20 Claims, 8 Drawing Sheets

(52) U.S. Cl.
CPC ......... *H04N 19/176* (2014.11); *H04N 19/182* (2014.11); *H04N 19/124* (2014.11)

(58) Field of Classification Search
CPC .. H04N 19/124; H04N 19/119; H04N 19/593; H04N 19/105; H04N 19/147; H04N 19/61; H04N 19/44
See application file for complete search history.

(56) References Cited

U.S. PATENT DOCUMENTS

2018/0146192 A1    5/2018   Tao et al.
2018/0352222 A1*  12/2018  Liu ..................... H04N 19/105

FOREIGN PATENT DOCUMENTS

| CN | 103200406 A | 7/2013 |
|---|---|---|
| CN | 104584550 A | 4/2015 |
| CN | 104702962 A | 6/2015 |
| CN | 105144718 A | 12/2015 |

OTHER PUBLICATIONS

Tencent Technology, IPRP, PCT/CN2019/109972, dated Apr. 14, 2021, 6 pgs.

Tencent Technology, ISR, PCT/CN2019/109972, dated Dec. 27, 2019, 2 pgs.

* cited by examiner

VIDEO ENCODING METHOD AND APPARATUS, VIDEO DECODING METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2019/109972, entitled "METHOD AND APPARATUS FOR VIDEO ENCODING, METHOD AND APPARATUS FOR VIDEO DECODING, COMPUTER DEVICE AND STORAGE MEDIUM" filed on Oct. 8, 2019, which claims priority to Chinese Patent Application No. 201811197962.5, filed with the State Intellectual Property Office of the People's Republic of China on Oct. 15, 2018, and entitled "VIDEO ENCODING METHOD AND APPARATUS, VIDEO DECODING METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a video encoding method and apparatus, a video decoding method and apparatus, a computer device, and a storage medium.

BACKGROUND OF THE DISCLOSURE

With the rapid development and wide application of multimedia technologies and network technologies, a large amount of video information is used in people's daily life and production activities. Videos need to be compressed and encoded to reduce the amount of transmitted data or stored data of the videos.

When video encoding is performed, an average value of a plurality of reference pixel values generally needs to be obtained, to obtain a predicted value of an encoding block, and the video encoding is then performed according to the predicted value. When the average value of the plurality of reference pixel values is obtained, a division operation is used, but an operation cycle of the division operation in a computer device is relatively long, resulting in a slow calculation speed and low efficiency of video encoding.

SUMMARY

Based on this, embodiments of this application provide a video encoding method and apparatus, a video decoding method and apparatus, a computer device, and a storage medium, to resolve the foregoing problem of low efficiency of video encoding and other technical problems.

A video encoding method is provided, the method including: obtaining a current encoding block to be encoded in a current video frame, the current encoding block having a width and a height that is different from the width; determining, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block; obtaining a predicted value corresponding to the current encoding block according to the target reference pixels; and performing video encoding on the current encoding block according to the predicted value, to obtain encoded data.

A computer device is provided, including a memory and a processor, the memory storing a plurality of computer programs. The computer programs, when executed by the processor, cause the computer device to perform the operations of the foregoing video encoding method.

A non-transitory computer-readable storage medium is provided, the computer-readable storage medium storing a plurality of computer programs. The computer programs, when executed by a processor of a computer device, cause the computer device to perform the operations of the foregoing video encoding method.

According to the foregoing video encoding method and apparatus, the computer device, and the storage medium, a prediction may be performed by obtaining target reference pixels whose quantity is the same as the e-th power of a target numeral system, and the target numeral system is a system used for calculating the predicted value. When the prediction is performed by using the target reference pixels, a pixel average value of the target reference pixels needs to be obtained. That is, a sum of pixel values of the target reference pixels is divided by a target quantity, to obtain the pixel average value. If the target quantity is the e-th power of the target numeral system, a shift operation may be used, and a division operation is avoided. Therefore, the calculation speed of calculating a predicted value during video encoding can be increased, and the encoding efficiency is improved.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

It may be understood that the terms "first", "second", and the like used in this application may be used for describing various elements in this specification. However, the elements are not limited by the terms unless otherwise specified. The terms are merely used for distinguishing a first element from another element. For example, without departing from the scope of this application, a first direction may be referred to as a second direction, and similarly, the second direction may be referred to as the first direction.

Figure 1:
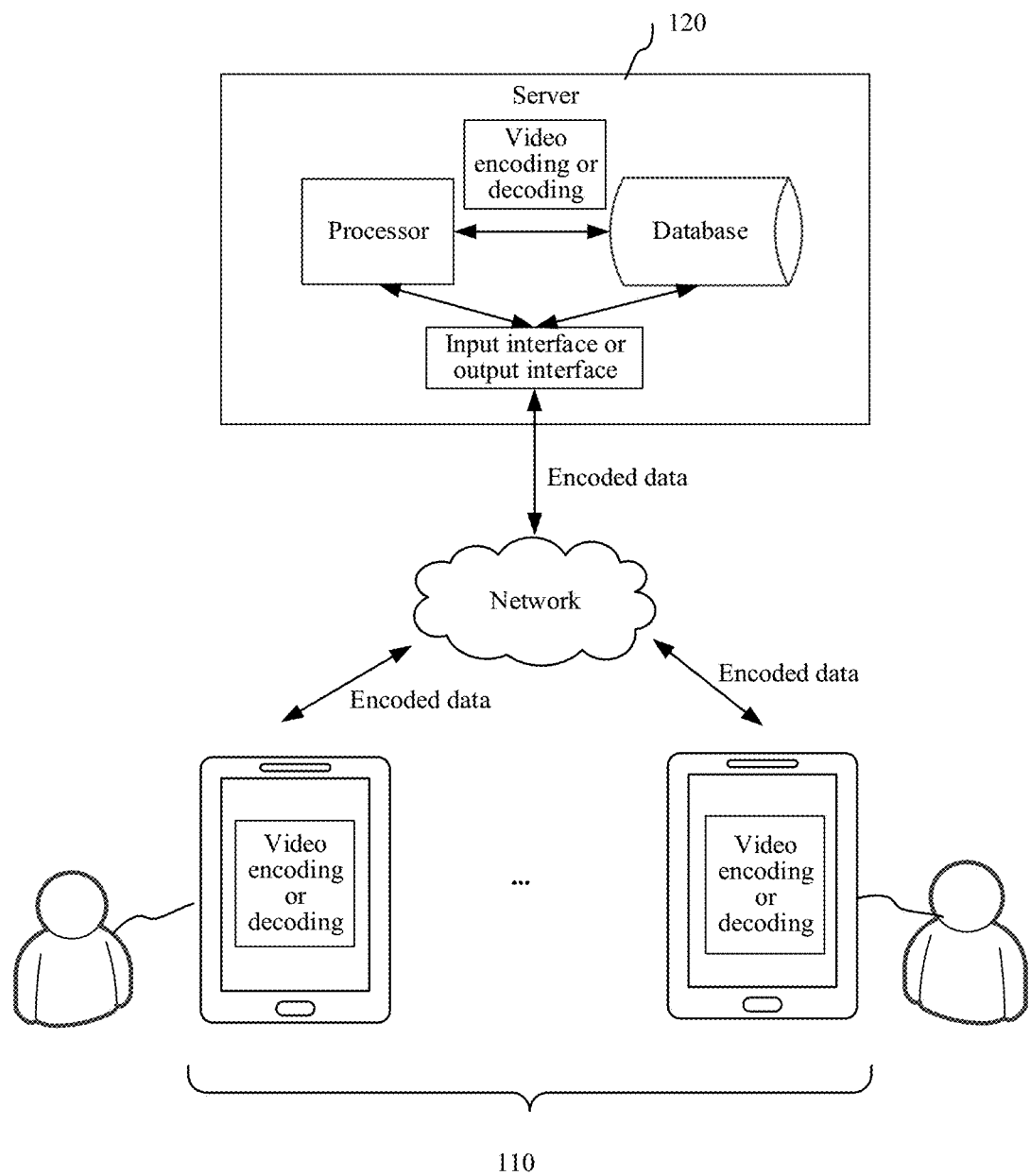
FIG. 1 is a diagram of an application environment of a video encoding method in an embodiment.

FIG. 1 is a diagram of an application environment of a video encoding method in an embodiment. As shown in FIG. 1, a terminal 110 and a server 120 are included in the application environment.

FIG. 1 is a diagram of an application environment of a video encoding method and a video decoding method in an embodiment. As shown in FIG. 1, a terminal 110 and a server 120 are included in the application environment. The terminal 110 may perform video encoding by using an encoder, or perform video decoding by using a decoder. Alternatively, the terminal 110 may perform video encoding by using a processor running a video encoding program, or perform video decoding by using a processor running a video decoding program. This is not specifically limited in this embodiment of this application.

The server 120 may perform video encoding by using an encoder, or perform video decoding by using a decoder. Alternatively, the server 120 may perform video encoding by using a processor running a video encoding program, or perform video decoding by using a processor running a video decoding program.

For example, after receiving, through an input interface, encoded data transmitted by the terminal 110, the server 120 may directly transfer the encoded data to the processor for decoding, or may store the encoded data in a database for subsequent decoding. Certainly, the server 120 may alternatively transmit the encoded data to a corresponding receiving terminal after obtaining encoded data transmitted by the terminal 110, and the receiving terminal decodes the encoded data. In another example, after receiving, through an input interface, a video frame transmitted by the terminal 110, and obtaining the encoded data by encoding the video frame by using the processor, the server 120 may directly transmit the encoded data to the terminal 110 through an output interface, or may store the encoded data in a database for subsequent transfer. This is not specifically limited in this embodiment of this application.

The terminal 110 and the server 120 may be connected by a network. The terminal 110 may be a desktop terminal or a mobile terminal, and the mobile terminal may be at least one of a mobile phone, a tablet computer, a notebook computer, and the like, but is not limited thereto. The server 120 may be implemented by an independent server or a server cluster that includes a plurality of servers.

Figure 2:
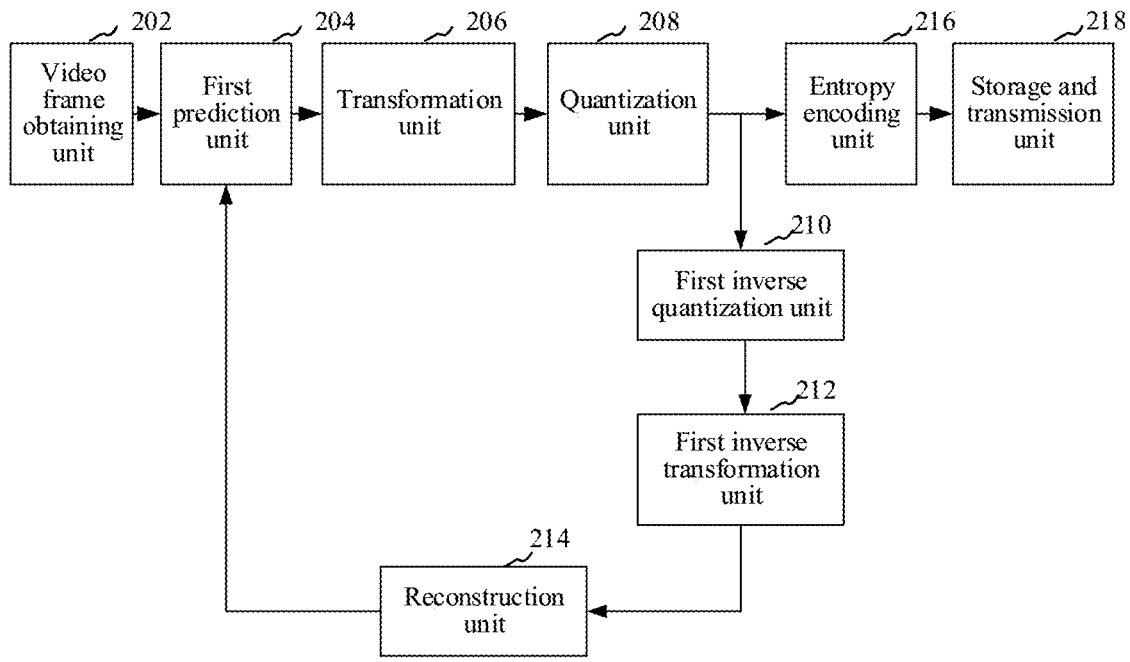
FIG. 2 is a diagram of an encoding framework corresponding to a video encoding method in an embodiment.

FIG. 2 is a diagram of an encoding framework corresponding to a video encoding method in an embodiment.

According to the video encoding method provided in this embodiment of this application, video frames of a video sequence may be obtained for encoding, to obtain corresponding encoded data, and one or more operations of storing or transmitting the encoded data by using a storage and transmission unit 218 are performed. A video frame obtaining unit 202 obtains a current video frame.

A first prediction unit 204 may perform intra-frame prediction or inter-frame prediction on encoding blocks of the current video frame. For example, when a prediction mode of an encoding block is inter-frame prediction, a predicted value and a corresponding motion vector are obtained according to an image value of a reference block corresponding to the encoding block, and the predicted value is subtracted from an actual value of the encoding block, to obtain a prediction residual. The motion vector represents a displacement of the encoding block relative to the reference block. When a prediction mode of an encoding block is an intra-frame prediction mode, reference pixels in a current video frame are obtained according to the type of the intra-frame prediction mode, a corresponding predicted value is calculated, and the predicted value is subtracted from an actual value of the encoding block, to obtain a prediction residual.

A transformation unit 206 transforms the prediction residual and vector information in a space domain into a frequency domain, and may encode a transformation coefficient. A transformation method may be discrete Fourier transform, discrete cosine transform or the like. The vector information may be an actual motion vector representing a displacement or a motion vector difference, the motion vector difference being a difference between the actual motion vector and a predicted motion vector.

A quantization unit 208 maps transformed data to another value. For example, the transformed data may be divided by a quantization step to obtain a relatively small value. A quantization parameter is a sequence number corresponding to the quantization step, and the value of the quantization parameter is an integer. A corresponding quantization step may be found according to the quantization parameter. A small quantization parameter indicates the reservation of most details of an image frame and a high corresponding bit rate. A large quantization parameter indicates a low corresponding bit rate, relatively high distortion and low image quality.

A principle of quantization is expressed by using the following formula: FQ=round (y/Qstep). y is a prediction residual corresponding to a video frame before quantization, Qstep is a quantization step, and FQ is a quantized value obtained by quantizing y. The function Round (x) is banker's rounding. That is, when the last digit of the value is less than or equal to 4, the value is rounded down. When the last digit of the value is greater than or equal to 6, the value is rounded up. When the last digit of the value is 5, if the previous digit of 5 is odd, 5 is removed, and the previous digit is added by 1, and if the previous digit of 5 is even, 5 is removed, and the previous digit remains unchanged. A correspondence between the quantization parameter and the quantization step may be set as required. For example, in some video encoding standards, for brightness encoding, the quantization step has 52 values that are integers from 0 to 51. For chroma encoding, the quantization step has values that are integers from 0 to 39. In addition, the quantization step increases as the quantization parameter increases. Each time the quantization parameter is increased by 6, the quantization step is doubled.

An entropy encoding unit 216 is configured to perform entropy encoding. The entropy encoding is a data encoding manner of encoding based on an entropy principle without loss of any information, to express a particular information with relatively few characters. An entropy encoding method may be, for example, Shannon coding or Huffman coding.

A first inverse quantization unit 210, a first inverse transformation unit 212, and a reconstruction unit 214 are units corresponding to a reconstruction path. A frame is reconstructed by using the units of the reconstruction path to obtain a reference frame, thereby maintaining the consistency between reference frames in encoding and decoding. A step performed by the first inverse quantization unit 210 is an inverse process of quantization. A step performed by the first inverse transformation unit 212 is an inverse process of transformation performed by the transformation unit 206. The reconstruction unit 214 is configured to add residual data obtained through inverse transformation to predicted data to obtain a reconstructed reference frame.

Figure 3:
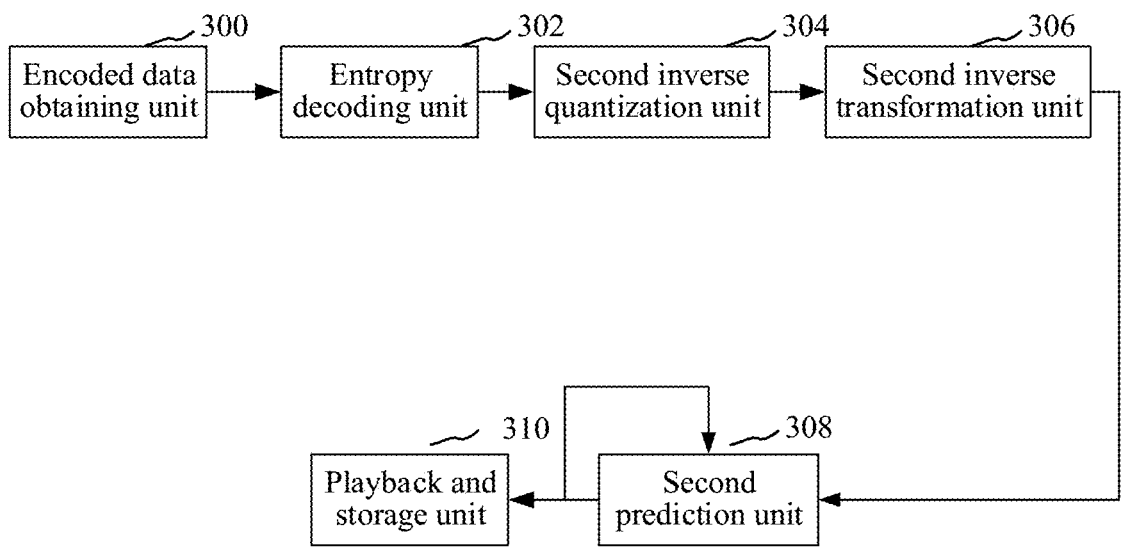
FIG. 3 is a diagram of a decoding framework corresponding to a video decoding method in an embodiment.

FIG. 3 is a diagram of a decoding framework corresponding to a video decoding method in an embodiment. According to the video decoding method provided in this embodiment of this application, an encoded data obtaining unit 300 obtains encoded data corresponding to to-be-decoded video frames of a to-be-decoded video sequence; an entropy decoding unit 302 performs entropy decoding, to obtain entropy-decoded data; a second inverse quantization unit 304 performs inverse quantization on the entropy-decoded data, to obtain inversely quantized data; and a second inverse transformation unit 306 performs inverse transformation on the inversely quantized data, to obtain inversely transformed data. The inversely transformed data may be consistent with the data that is obtained after inverse transformation performed by the first inverse transformation unit 212 in FIG. 2.

A second prediction unit 308 performs intra-frame prediction or inter-frame prediction on the to-be-decoded block according to the prediction mode of the to-be-decoded block. For example, when the inter-frame prediction is performed, a target reference block corresponding to the to-be-decoded block is obtained according to motion vector information carried in the encoded data, a predicted value consistent with the predicted value in FIG. 2 is obtained according to an image value of the target reference block, pixel values of a decoded video data block are obtained according to the predicted value and the prediction residue in the encoded data. The reference block is obtained from a reference frame that has been decoded by the second prediction unit 308.

When a prediction mode of an encoding block is an intra-frame prediction mode, reference pixels in a current video frame are obtained according to the type of the intra-frame prediction mode, a corresponding predicted value is calculated, and the predicted value is subtracted from an actual value of the encoding block, to obtain a prediction residual. A playback and storage unit 310 may perform one or more steps of playing a video and storing a video on the decoded video frame.

It may be understood that the foregoing diagram of an encoding framework and diagram of a decoding framework are merely examples, and do not constitute a limitation to the encoding method to which the solutions of this application are applied. The diagram of an encoding framework and the diagram of a decoding framework may include more or fewer units than those shown in the figures, or some units may be combined, or a different unit deployment may be used. For example, loop filtering may further be performed on the reconstructed video frame, to reduce blocking artifacts of the video frame, thereby improving video quality.

In the embodiments of this application, an end performing encoding is referred to as an encoding end, and an end performing decoding is referred to as a decoding end. The encoding end and the decoding end may be the same end or different ends. The foregoing computer devices, for example, the terminal and the server, may be the encoding end and the decoding end.

Figure 4A:
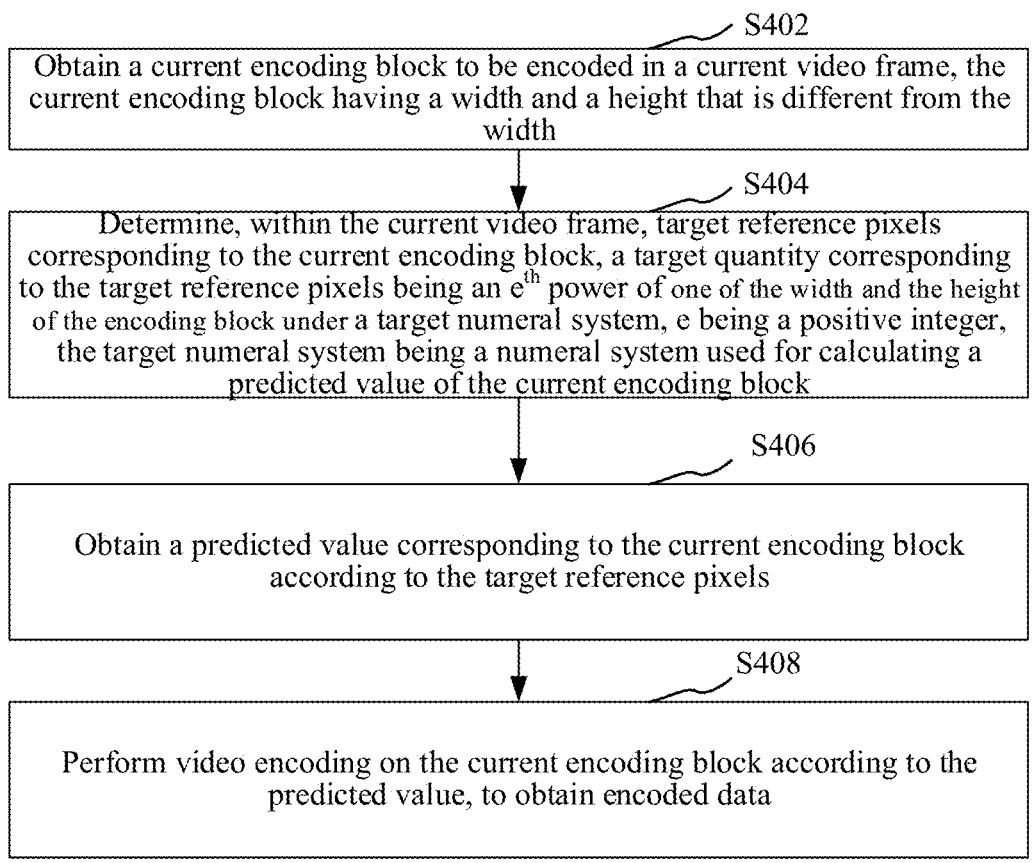
FIG. 4A is a flowchart of a video encoding method in an embodiment.

As shown in FIG. 4A, in an embodiment, a video encoding method is provided. The video encoding method provided in this embodiment may be applied to the terminal 110 or the server 120 in FIG. 1. The method may include the following steps:

Step S402. Obtain a current encoding block to be encoded in a current video frame. In some embodiments, the width and height of the current encoding block may be different from each other. In some other embodiments, the width and height of the current encoding block may be the same.

Figure 4B:
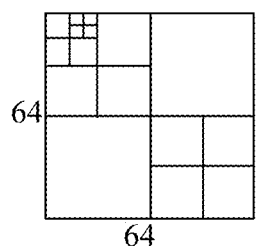
FIG. 4B is a schematic diagram of the division of an image block in an embodiment.

The video frame is a unit forming a video. The video frame may be a video frame that is acquired by a computer device in real time. For example, the video frame may be obtained by using a camera of the terminal in real time. The video frame may be a video frame corresponding to a prestored video sequence. One video may be considered as one video frame sequence, and one video frame sequence may include a plurality of video frames. The current video frame is a video frame that needs to be encoded currently, and may be any one of the plurality of video frames, and the current encoding block is an encoding block that currently needs to be encoded in the current video frame. The video frame may include one or more encoding block, and the size of the encoding block may be set as required. For example, one video frame may be divided into a plurality of encoding blocks of 4*8 or 8*4 pixels. Alternatively, for the size of the encoding block in the video frame, rate-distortion costs corresponding to division manners of various encoded blocks may be calculated, and a division manner corresponding to a low rate-distortion cost may be selected for the division of the encoded blocks. FIG. 4B is a schematic diagram of the division of an image block of 64*64 pixels. One block represents one encoding block. It may be learned from FIG. 4B that, the size of the encoding block may include 32*32 pixels, 16*16 pixels, 8*8 pixels, and 4*4 pixels. Certainly, the size of the encoding block may be alternatively another size, for example, 32*16 pixels or 64*64 pixels.

Step S404. Determine, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block.

The target reference pixels are obtained from a reconstruction frame obtained through reconstruction after being encoded at an encoding end. The target reference pixels are used for calculating a predicted value of the current encoding block. When video encoding is performed, reference pixels corresponding to the current encoding block generally need to be found, a predicted value corresponding to the current encoding block is calculated according to the reference pixels, and a prediction residual is obtained according to a difference between an actual value and the predicted value, to further encode the prediction residual, thereby reducing a data volume of a video. The system is a positional numeral system, and is a counting method with carries, for example, a binary system, a decimal system, and a hexadecimal system. The same number may be represented with different systems. For example, a decimal number 57 is 111001 in the binary system and is 212 in the quinary system. The target numeral system is a numeral system used during the calculation of the predicted value of the current encoding block. The system used during the calculation of the predicted value of the current encoding block may be determined according to one or more of hardware parameters and software parameters corresponding to a device performing the video encoding. For example, currently, most computing methods used by the computer device are the binary system, and the target numeral system may be the binary system. The target quantity being the e-th power of the target numeral system means that, it is assumed that the target numeral system is a, e is a positive integer, and the e-th power of a is represented by $a^e$. That is, the target quantity represents a product of multiplying a e times.

In an embodiment, the target reference pixels may be determined according to the prediction mode corresponding to the current encoding block. For example, for a direct current (DC) mode of the intra-frame prediction mode, the target reference pixels may include adjacent pixels on the upper side and the left side of the current encoding block.

In an embodiment, adjacent pixels may be obtained in all directions of the current encoding block and are used as the target reference pixels. The current encoding block may include two directions, for example, a height direction and a width direction. The target reference pixels are obtained in the directions, so that the predicted value of the current encoding block is closer to the actual value, thereby reducing a data volume of the encoded data.

In an embodiment, a reconstructed pixel whose distance to the current encoding block is less than a preset distance may be used as the target reference pixels. The preset distance may be set as required, for example, a distance of 2 pixels. The reconstructed pixel is a pixel obtained through the reconstruction of a reconstruction path.

In an embodiment, the target reference pixel may be a pixel whose distance to a boundary of the current encoding block is less than a preset distance, for example, a pixel that has a boundary overlapping a pixel in the current encoding block.

In an embodiment, the video encoding method provided in this embodiment of this application may be applied to the intra-frame prediction. Therefore, the target reference pixel is obtained from the video frame in which the current encoding block is located. Alternatively, the target reference pixel may be obtained from another video frame.

In the video encoding, to keep reference frames in the encoding end and the decoding end consistent to enable the same image block in the encoding end and the decoding end to correspond to the same predicted value, the target reference pixel is obtained from the reconstruction frame obtained after the encoding end performs encoding and reconstruction.

Step S406. Obtain a predicted value corresponding to the current encoding block according to the target reference pixels.

The predicted value of the current encoding block is a pixel value obtained by predicting the target reference pixels. The predicted value of the current encoding block is obtained according to pixel values of the target reference pixels. The predicted value of the current encoding block may be obtained by performing a weighted sum of the target reference pixels and corresponding weights, and the weights of the target reference pixels may be set as required. For example, all weights of the target reference pixels may be set to be equal to the reciprocal of a quantity of target reference pixels. That is, the predicted value of the current encoding block is an average value of pixel values of the target reference pixels. Certainly, the predicted value may be alternatively a value obtained through further calculation according to the average value. For example, the predicted value may be alternatively obtained by adding a preset pixel value to the average value, and the preset pixel value may be determined according to the target quantity. A calculation method of the predicted value may be represented by using Formula (1) or Formula (2). P represents a predicted value, P1 is the pixel value of the first target reference pixel, Pm is the pixel value of an $m^{th}$ target reference pixel, m represents the quantity of target reference pixels, and b may be set as required, for example, is equal to m. Because the target quantity m is the e-th power of the target numeral system, when the target numeral system is used for calculating the predicted value, the target quantity m in Formula (1) and Formula (2) may be transformed into the e-th power of the target numeral system for calculation, to quickly calculate the predicted value.

$$P=(P1+ \ldots +Pm)/m \quad (1)$$

$$P=(P1+ \ldots +Pm+b)/m \quad (1)$$

In an embodiment, the predicted value of the current encoding block may be the same as the predicted values of pixels in the current encoding block, or the predicted value of the current encoding block may be different from the predicted values of pixels in the current encoding block. For example, in the DC mode of the intra-frame prediction mode, the predicted values of the pixels in the current encoding block may be the same. Certainly, the predicted value may be alternatively transformed according to a distance from the pixel in the current encoding block to the target reference pixel. For example, the predicted value corresponding to the pixels in the current encoding block may be P*0.99i, and i is a pixel quantity between the current encoding block and the target reference pixels.

In an embodiment, the obtaining a predicted value corresponding to the current encoding block according to the target reference pixels includes: performing a summation operation on pixel values of the target reference pixels, to obtain a pixel statistical value; and obtaining a shift bit number according to the target quantity, performing shift calculation according to the shift bit number and the pixel statistical value, to obtain a shift result, and obtaining the predicted value corresponding to the current encoding block according to the shift result.

The shift calculation is performing a left shift or a right shift on a number. The left shift is shifting to the left, and is equivalent to multiplying the number by a corresponding target numeral system. The right shift is shifting to the right, and is equivalent to dividing the number by a corresponding system. For example, for the binary system, the left shift is shifting the number represented by using the binary system to the left by a corresponding bit number. A high bit number is shifted out, and an empty position of a low bit number is filled with 0. The right shift is shifting the number represented by using the binary system to the right by a corresponding bit number. A low bit number is shifted out, and an empty position of a high bit number is filled with a sign bit. That is, a positive number is filled with zero, and a negative number is filled with 1.

For example, a number 8 divided by 2 is a number 4. The using the foregoing shift calculation may include: A binary representation of the number 8 is 1000, 1000 divided by 2 is shifting to the right by one bit, to obtain a binary 0100, and the binary 0100 represents the number 4. A number 3 is multiplied by a number 2 to obtain a number 6. The using the foregoing shift calculation may include: A binary identifier of the number 3 is 0011, 0011 multiplied by 2 is shifting to the left by one bit, to obtain a binary 0110, and the binary 0110 identifies the number 6.

Therefore, in the target numeral system, all shifting to the left by one bit is equivalent to multiplication by the first power of the target numeral system, and shifting to the left by e bits is equivalent to multiplication by the e-th power of the target numeral system. Shifting to the right by one bit is equivalent to the division by the first power of the target numeral system, and shifting to the right by e bits corresponds to the division by the e-th power of the target numeral system. A left shift symbol may be represented by "«", and a right shift symbol may be represented by "»". After the target reference pixels are obtained, a statistical sum of the pixel values of the target reference pixels is performed, to obtain a pixel statistical value. A shift may be performed on the pixel statistical value, or a further calculation may be performed according to the pixel statistical value, to obtain a value that needs to be shifted. For example, the shift calculation is performed after a preset value b is added to the pixel statistical value. After the shift result is obtained, the shift result may be used as a predicted value corresponding to the current encoding block, or the shift result may further be calculated, to obtain a predicted value. For example, the shift result is multiplied by a preset coefficient to obtain the predicted value. The preset coefficient may be set as required, for example, 0.99.

As shown in Formula (1), a numerator P1+ . . . +Pm on the right side of the formula represents a pixel statistical value of m target reference pixels. A denominator, that is, the target quantity m, is used for calculating the shift bit number. The shift bit number may be $\log_a a^e$, that is, the shift bit number is e. During shifting, a shift may be performed on the pixel statistical value, or a further calculation may be performed on the pixel statistical value, to obtain a value that needs to be shifted, and a shift is then performed on the value that needs to be shifted. For example, the pixel statistical value may be multiplied by a preset proportion, to obtain a product, and a shift calculation is performed on the obtained product. Alternatively, the preset value may be added to the pixel value, and a shift calculation is performed on a sum obtained through adding. Because the pixel statistical value is obtained through addition, a shift direction is the right shift. Therefore, in actual calculation, Formula (1) may be transformed into Formula (3) for calculation, and Formula (2) may be transformed into Formula (4) for calculation. In this way, division of Formula (1) and Formula (2) is transformed into the shift calculation. The division operation has a relatively long operation cycle and a large hardware loss in the computer device, or a special hardware device needs to be configured for calculation. However, by using the shift calculation, the shift bit number may be obtained according to the target quantity, and the shift calculation is performed according to the shift bit number and the pixel statistical value. In this way, the division calculation is replaced with the shift calculation, so that the division operation can be reduced or avoided, and an operation time and a loss to the hardware device are reduced.

$$P=(P1+\ldots+Pm)\gg\log_a m \quad (3)$$

$$P=(P1+\ldots+Pm+b)\gg\log_a m \quad (4)$$

Step S408. Perform video encoding on the current encoding block according to the predicted value, to obtain encoded data.

After the predicted value is obtained, the actual value of the current encoding block may be subtracted from the predicted value, to obtain a prediction residual, and one or more steps of performing transformation, quantization, and entropy encoding according to the prediction residual are performed, to obtain the encoded data.

According to the foregoing video encoding method, a prediction may be performed by obtaining target reference pixels whose quantity is the same as the e-th power of a target numeral system, and the target numeral system is a system used for calculating the predicted value. When the prediction is performed by using the target reference pixels, a pixel average value of the target reference pixels needs to be obtained. That is, a sum of pixel values of the target reference pixels is divided by a target quantity, to obtain the pixel average value. If the target quantity is the e-th power of the target numeral system, a shift operation may be used, and a division operation is avoided. Therefore, the calculation speed of calculating a predicted value during video encoding can be increased, and the encoding efficiency is improved.

Figure 5A:
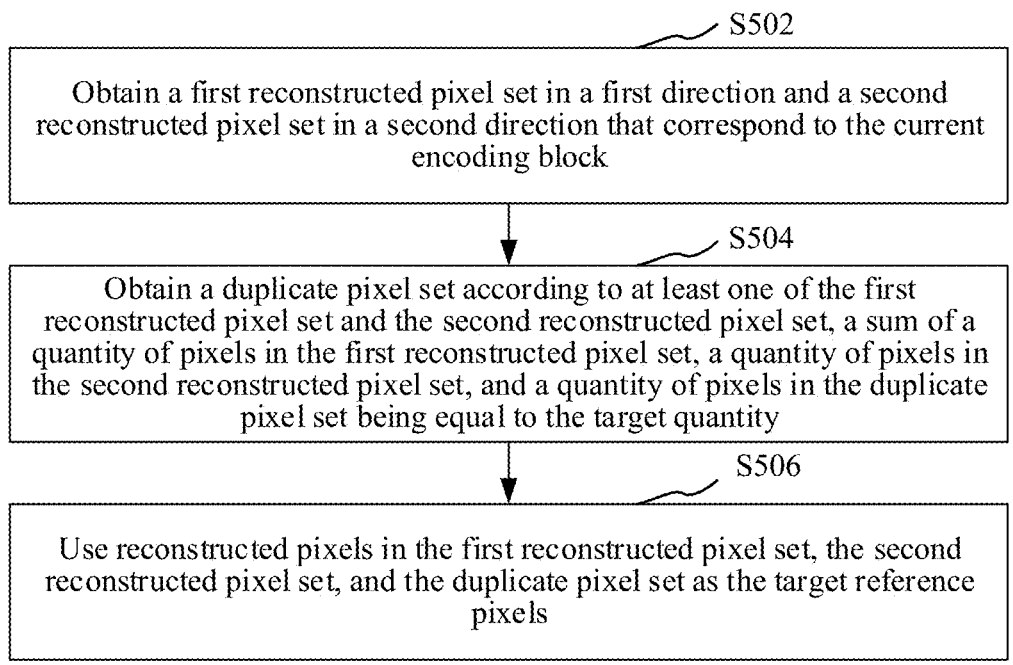
FIG. 5A is a flowchart of determining target reference pixels corresponding to a current encoding block in an embodiment.

In an embodiment, as shown in FIG. 5A, step S404, that is, the step of determining target reference pixels corresponding to a current encoding block, may include the following steps:

Step S502. Obtain a first reconstructed pixel set in a first direction and a second reconstructed pixel set in a second direction that correspond to the current encoding block. In some embodiments, the first direction is one of the width and the height of the current encoding block and the second direction is the other one of the width and the height of the current encoding block.

The current encoding block may include two directions, namely, a height direction and a width direction. If the current encoding block is in the height direction, pixels in the reconstructed pixel set corresponding to the height direction are reconstructed pixels adjacent to an edge corresponding to the height of the current encoding block. For example, the reconstructed pixels corresponding to the height direction may be reconstructed pixels located on at least one of the left side or the right side of the current encoding block. If the current encoding block is in the width direction, pixels in the reconstructed pixel set corresponding to the width direction is reconstructed pixels adjacent to an edge corresponding to the width of the current encoding block. For example, the pixels in the reconstructed pixel set corresponding to the width direction may be reconstructed pixels on at least one of the upper side or the left side of the current encoding block.

In a possible implementation, the definition of adjacency may be set as required. For example, the adjacency is defined as being less than the preset distance. The first direction may be one of the height direction and the width direction, and the second direction may be one of the height direction and the width direction. However, the first direction and the second direction are different. For example, if the first direction is the height direction, the second direction is the width direction. A quantity of pixels in the first reconstructed pixel set and a quantity of pixels in the second reconstructed pixel set may be set as required, and may be equal or not equal. For example, the quantity of pixels in the first reconstructed pixel set is 8, and the quantity of pixels in the second reconstructed pixel set is 4.

Figure 5B:
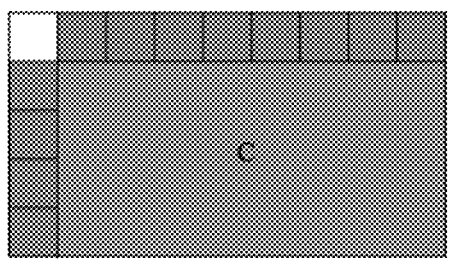
FIG. 5B is a schematic diagram of a current encoding block and corresponding target reference pixels in an embodiment.

In an embodiment, the quantity of pixels in the first reconstructed pixel set may be determined according to the length of the current encoding block in the first direction, and the quantity of pixels in the second reconstructed pixel set may be determined according to the length of the current encoding block in the second direction. The quantity of pixels in the first reconstructed pixel set may be equal to a pixel quantity corresponding to the length of the current encoding block in the first direction. The quantity of pixels in the second reconstructed pixel set may be equal to a pixel quantity corresponding to the length of the current encoding block in the second direction. Certainly, the quantity of pixels in the first reconstructed pixel set and the quantity of pixels in the second reconstructed pixel set may be different by a predetermined length. For example, as shown in FIG. 5B, it is assumed that the current encoding block is a rectangular encoding block C in FIG. 5B, one square represents one pixel, the rectangular encoding block has a height of four pixels and a width of eight pixels. In this case, a reconstructed pixel set corresponding to the height direction may be a set formed by four gray pixels on the left side of the current encoding block. A reconstructed pixel set corresponding to the width direction may be a set formed by eight gray pixels on the upper side.

In an embodiment, pixels in one or more of the first reconstructed pixel set and the second reconstructed pixel set are pixels adjacent to the current encoding block.

In an embodiment, a pixel quantity of an edge corresponding to the height of the current encoding block is the $r^{th}$ power of the target numeral system, and a pixel quantity of an edge corresponding to the width of the current encoding block is the $j^{th}$ power of the target numeral system. r and j are positive integers. For example, if the target numeral system is the binary system, the current encoding block may be an encoding block of 8*4 pixels, and both 8 and 4 are e-th powers of the target numeral system of 2.

Step S504. Obtain a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity.

The obtaining a duplicate pixel set according to at least one of the first reconstructed pixel set and the second reconstructed pixel set may include: obtaining the duplicate pixel set according to the reconstructed pixels in the first reconstructed pixel set; or obtaining the duplicate pixel set according to the reconstructed pixels in the second reconstructed pixel set; or obtaining the duplicate pixel set according to the reconstructed pixels in the first reconstructed pixel set and the second reconstructed pixel set.

The duplicate pixel set is obtained by duplicating the reconstructed pixels in at least one of the first reconstructed pixel set and the second reconstructed pixel set. During duplication, only all or some of pixels in the first reconstructed pixel set may be duplicated, or only all or some of pixels in the second reconstructed pixel set may be duplicated, or certainly, all or some of pixels in both the first reconstructed pixel set and the second reconstructed pixel set may be duplicated.

In a possible implementation, the sum of the quantity of pixels in the first reconstructed pixel set, the quantity of pixels in the second reconstructed pixel set, and the quantity of pixels in the duplicate pixel set is the e-th power of the target numeral system. That is, the sum is the target quantity. For example, if the target quantity is 16, the quantity of pixels in the first reconstructed pixel set may be 8, the quantity of pixels in the second reconstructed pixel set may be 4, and the quantity of pixels in the duplicate pixel set is 4.

In an embodiment, during duplication, a size relationship between two lengths may be determined according to the length of the current encoding block in the first direction and the length of the current encoding block in the second direction, so as to determine a reconstructed pixel set that needs to be duplicated. A reconstructed pixel set corresponding to a direction with a small length may be used as the duplicate pixel set. For example, still referring to FIG. 5B, the height of the current encoding block is less than the width of the current encoding block. The reconstructed pixel set formed by the four gray pixels on the left side may be duplicated, to obtain the duplicate pixel set. The duplicate pixel set is formed by the same pixels as the four pixels.

In an embodiment, for a rectangular encoding block, reconstructed pixels are selected from another column adjacent to the first column of the current encoding block, and the selected reconstructed pixels are used as the reconstructed pixels corresponding to the height direction. Reconstructed pixels are selected from another row adjacent to the first row of the current encoding block, and the selected reconstructed pixels are used as the reconstructed pixels corresponding to the width direction.

In an embodiment, reconstructed pixels may be selected from the reconstructed pixels adjacent to the left side and the reconstructed pixels adjacent to the upper side of the current encoding block and are used as the target reference pixels, and the predicted value of the current encoding block is calculated.

In an embodiment, the pixel quantity corresponding to the second reconstructed pixel set is greater than the pixel quantity corresponding to the first reconstructed pixel set. During the calculation of the predicted value, a left shift calculation is performed on a first pixel statistical value corresponding to the first reconstructed pixel set, to obtain a shifted pixel statistical value. A shift bit number corresponding to the left shift is determined according to a ratio n of the second reconstructed pixel set to the first reconstructed pixel set. The shift bit number corresponding to the left shift may be $\log_a n$. That is, the first pixel statistical value is multiplied by the ratio n, to obtain the shifted pixel statistical value. In this way, pixels corresponding to the first reconstructed pixel set are duplicated, so that weights corresponding to the first reconstructed pixels and the second reconstructed pixels are equal during the calculation of the predicted values. The pixel statistical value is obtained according to the shifted pixel statistical value and a second pixel statistical value corresponding to the second reconstructed pixel set.

For example, when a ratio of the width to the height of the current encoding block is n, n is a power of the target numeral system a, and n is a positive integer, that is, when the width of the current encoding block is greater than the height, Formula (2) may be transformed into Formula (5) during actual calculation. DC value represents the predicted value, and a represents the target numeral system, for example, 2. w represents the width of the current encoding block, and is represented by a pixel quantity; and h represents the height of the current encoding block, and is represented by the pixel quantity. w and h are greater than or equal to 2, and a sum of w+w is the $t^{th}$ power of the target numeral system, where t is a positive integer.

For example, in FIG. 5B, w is 8, and h is 4. The position of the pixel in the first row and the first column of the current encoding block may be represented by (0, 0), p(x, −1) is the pixel value of an adjacent pixel on the upper side of the current encoding block, and p(−1, y) is the pixel value of an adjacent pixel located on the left side of the current encoding block. When x is equal to 0, p(x, −1) represents the pixel value of a pixel on the upper side of the first pixel in the first row of the current encoding block. When x is equal to w−1, p(x, −1) represents the pixel value of a pixel on the upper side of a $w^{th}$ pixel in the first row of the current encoding block. When y is equal to 0, p(−1, y) represents the pixel value of a pixel located on the left side of the first pixel in the first column of the current encoding block. When y is equal to h−1, p(−1, y) represents the pixel value of a pixel located on the left side of an $h^{th}$ pixel in the first column of the current encoding block.

"«" is the left shift symbol, "»" is the right shift symbol, $\log_a n$ is the left shift bit number, and $\log_a(w+w)$ is the right shift bit number.

$$\sum_0^{w-1} p(x, -1)$$

represents a pixel statistical value of pixels from the first pixel to the upper side of the $w^{th}$ pixel in the first row of the current encoding block.

$$\sum_0^{h-1} p(-1, y)$$

represents a pixel statistical value of pixels from the first pixel to the left side of the $w^{th}$ pixel in the first column of the current encoding block.

It can be learned from Formula (5) that, when the width of the current encoding block is greater than the height, and the target reference pixels are obtained, because the left side of the pixels in the current encoding block has fewer adjacent pixels, a left shift needs to be performed on the reconstructed pixels on the left side, that is, in the height direction. That is, the pixels on the left side are duplicated, so that a proportion of the adjacent reconstructed pixels on the left side is consistent with a proportion of the upper reconstructed pixels during the calculation of the predicted value.

$$DCvalue = \left( \sum_0^{w-1} p(x, -1) + \left( \left( \sum_0^{h-1} p(-1, y) \right) \langle\langle \log_a n \rangle + b \right) \right) \rangle \log_a(w+w) \quad (5)$$

In an embodiment, similarly, when the ratio of the height to the width of the current encoding block is n, n is the power of the target numeral system a, and n is a positive integer, a sum of (h+h) is a $u^{th}$ power of the target numeral system, and u is a positive integer. That is, when the height of the current encoding block is greater than the width, the adjacent reconstructed pixels on the left side and the adjacent reconstructed pixels on the upper side of the current encoding block may be used, pixels are selected from the reconstructed pixels, and are used as the target reference pixels, and the predicted value of the current encoding block is calculated. In this case, Formula (2) may be transformed into Formula (6) during the actual calculation. It can be learned from Formula (6) that, when the height of the current encoding block is greater than the width, and the target reference pixels are obtained, because the upper side of the pixels in the current encoding block has fewer adjacent pixels, a left shift needs to be performed on the upper side, that is, the reconstructed pixels in the width direction. That is, the pixels on the upper side are duplicated, so that a proportion of the adjacent reconstructed pixels on the left side is consistent with a proportion of the upper reconstructed pixels during the calculation of the predicted value.

$$DCvalue = \left( \left( \left( \sum_0^{w-1} p(x, -1) \langle\langle \log_a n \rangle + \left( \sum_0^{h-1} p(-1, y) + b \right) \right) \rangle \log_a(h+h) \right. \quad (6)$$

Parameters in Formula (6) are similar to parameters in Formula (5), and the parameters also correspond to similar meanings. Details are not described herein again.

Step S506. Use reconstructed pixels in the first reconstructed pixel set, the second reconstructed pixel set, and the duplicate pixel set as the target reference pixels.

After the duplicate pixel set is obtained, all reconstructed pixels in the first reconstructed pixel set, the second reconstructed pixel set, and the duplicate pixel set are used as the target reference pixels, so that a target quantity corresponding to the target reference pixels is the e-th power of the target numeral system.

In an embodiment, step S404, that is, the step of determining target reference pixels corresponding to the current encoding block may include the following steps: obtaining a first reconstructed pixel set in a first direction and a second reconstructed pixel set in a second direction that correspond to the current encoding block, and using reconstructed pixels in the first reconstructed pixel set and the second reconstructed pixel set as the target reference pixels.

In a possible implementation, the first direction may be one of the height direction and the width direction, and the second direction may be one of the height direction and the width direction. However, the first direction and the second direction are different. For example, if the first direction is the height direction, the second direction is the width direction. The quantity of pixels in the first reconstructed pixel set and the second reconstructed pixel set may be set as required, but a sum of the quantity of pixels in the first reconstructed pixel set and the quantity of pixels in the second reconstructed pixel set is the e-th power of the target numeral system, that is, is equal to the target quantity. For example, if the target quantity is 16, the quantity of pixels in the first reconstructed pixel set may be 9, and the quantity of pixels in the second reconstructed pixel set may be 7.

In an embodiment, the quantity of reconstructed pixels in the first reconstructed pixel set is equal to the quantity of reconstructed pixels in the second reconstructed pixel set. For example, if the target quantity is 8, four reconstructed pixels may be obtained from the left side of a current target encoding block to form the first reconstructed pixel set, and four reconstructed pixels may be obtained from the upper side of the current target encoding block to form the second reconstructed pixel set.

Figure 6:
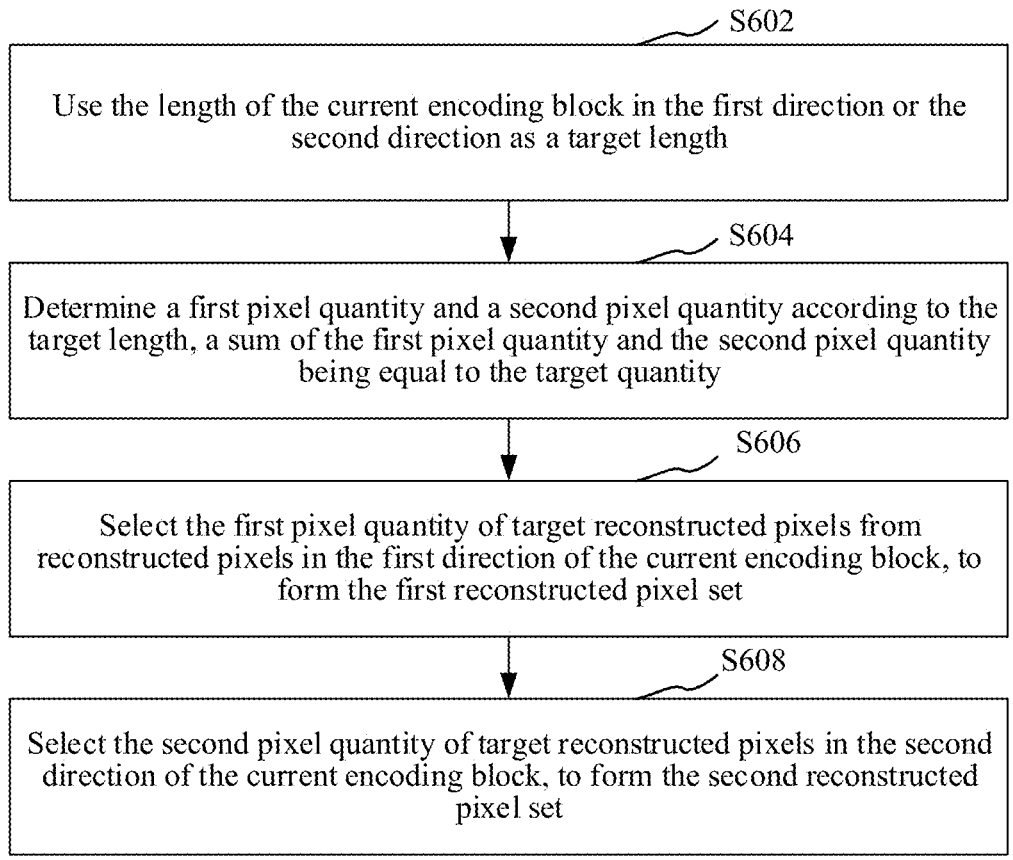
FIG. 6 is a flowchart of obtaining a first reconstructed pixel set in a first direction and a second reconstructed pixel set in a second direction of a current encoding block in an embodiment.

In an embodiment, as shown in FIG. 6, the obtaining a first reconstructed pixel set in a first direction and a second reconstructed pixel set in a second direction that correspond to the current encoding block includes the following steps:

Step S602. Use the length of the current encoding block in the first direction or the second direction as a target length.

In a possible implementation, the length of the current encoding block may be represented by the pixel quantity.

For example, if the current encoding block is a 4*8 encoding block, a length in the width direction is 4 pixels, and a length in the height direction is 8 pixels. The length of the current encoding block in any one of the first direction or the second direction may be used as the target length, and may be set as required.

In an embodiment, the length of the current encoding block in the first direction is used as the target length in a case that the length of the current encoding block in the first direction is greater than the length in the second direction.

A length corresponding to a direction of a longer length in the current encoding block may be used as the target length. For example, if the width of the current encoding block is greater than the height, the width is the target length.

In an embodiment, the length of the current encoding block in the first direction is used as the target length in a case that the length of the current encoding block in the first direction is less than the length in the second direction.

A length corresponding to a direction with a shorter length in the current encoding block may be used as the target length. For example, if the width of the current encoding block is greater than the height, the height is the target length.

Step S604. Determine a first pixel quantity and a second pixel quantity according to the target length, a sum of the first pixel quantity and the second pixel quantity being equal to the target quantity.

The first pixel quantity and the second pixel quantity are obtained according to the target length. In an embodiment, if twice of the target length is the e-th of the target numeral system, one or more of the first pixel quantity and the second pixel quantity may be the same as a pixel quantity corresponding to the target length. That is, the first pixel quantity may be the same as the pixel quantity corresponding to the target length, or the second pixel quantity may be the same as the pixel quantity corresponding to the target length, or both the first pixel quantity and the second pixel quantity are the same as the pixel quantity corresponding to the target length.

Certainly, alternatively, the preset quantity may be subtracted from or added to the target length to obtain one or more of the first pixel quantity and the second pixel quantity. That is, the preset quantity is subtracted from or added to the target length to obtain the first pixel quantity, or the preset quantity is subtracted from or added to the target length to obtain the second pixel quantity, or the preset quantity is subtracted from the target length to obtain the first pixel quantity and the second pixel quantity, or the preset quantity is added to the target length to obtain the first pixel quantity and the second pixel quantity, so that the sum of the first pixel quantity and the second pixel quantity is equal to the e-th power of the target numeral system, that is the target quantity. For example, if the target length is 8, twice of 8 is 16. It is assumed that the target numeral system is 2, and 16 is the fourth power of 2. Therefore, the first pixel quantity and the second quantity may be 8. If the target length is 6, the first pixel quantity may be 6, and the second pixel quantity may be equal to 10 obtained by adding the target length of 6 to 4.

Step S606. Select the first pixel quantity of target reconstructed pixels from reconstructed pixels in the first direction of the current encoding block, to form the first reconstructed pixel set.

After the first pixel quantity is obtained, if the first direction is the width direction, target reconstructed pixels may be selected from reconstructed pixels on the upper side and/or the lower side of the current encoding block. That is, the target reconstructed pixels are selected from the reconstructed pixels on the upper side of the current encoding block, or the target reconstructed pixels are selected from the reconstructed pixels on the lower side of the current encoding block, or the target reconstructed pixels are selected from the reconstructed pixels on the upper side and the lower side of the current encoding block. A quantity of target reconstructed pixels is the first pixel quantity.

If the first direction is the height direction, target reconstructed pixels may be selected from reconstructed pixels on the left side and/or the right side of the current encoding block. That is, the target reconstructed pixels are selected from the reconstructed pixels on the left side of the current encoding block, or the target reconstructed pixels are selected from the reconstructed pixels on the right side of the current encoding block, or the target reconstructed pixels are selected from the reconstructed pixels on the left side and the right side of the current encoding block. A quantity of target reconstructed pixels is the first pixel quantity.

In an embodiment, the target reconstructed pixels are pixels adjacent to the current encoding block.

Step S608. Select the second pixel quantity of target reconstructed pixels in the second direction of the current encoding block, to form the second reconstructed pixel set.

After the second pixel quantity is obtained, if the second direction is the width direction, target reconstructed pixels may be selected from reconstructed pixels on the upper side and/or the lower side of the current encoding block. That is, the target reconstructed pixels are selected from the reconstructed pixels on the upper side of the current encoding block, or the target reconstructed pixels are selected from the reconstructed pixels on the lower side of the current encoding block, or the target reconstructed pixels are selected from the reconstructed pixels on the upper side and the lower side of the current encoding block. A quantity of target reconstructed pixels is the second pixel quantity.

If the second direction is the height direction, target reconstructed pixels may be selected from reconstructed pixels on the left side and/or the right side of the current encoding block. That is, the target reconstructed pixels are selected from the reconstructed pixels on the left side of the current encoding block, or the target reconstructed pixels are selected from the reconstructed pixels on the right side of the current encoding block, or the target reconstructed pixels are selected from the reconstructed pixels on the left side and the right side of the current encoding block. A quantity of target reconstructed pixels is the second pixel quantity.

In an embodiment, the target reconstructed pixels are pixels adjacent to the current encoding block.

In an embodiment, when the length of the current encoding block in the first direction is used as the target length in a case that the length of the current encoding block in the first direction is greater than the length in the second direction, step S606, that is, the selecting the first pixel quantity of target reconstructed pixels from reconstructed pixels in the first direction of the current encoding block, to form the first reconstructed pixel set includes: selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length. Step S608, that is, the selecting the second pixel quantity of target reconstructed pixels in the second direction of the current encoding block, to form the second reconstructed pixel set includes: selecting adjacent reconstructed pixels and non-adjacent reconstructed pixels in the second direction of the current encoding block according to the second pixel quantity, and using the selected reconstructed pixels as the target reconstructed pixels, to form the second reconstructed pixel set, the second pixel quantity being greater than or equal to a pixel quantity of the current encoding block in the second direction.

For example, if the current encoding block is a 4*8 encoding block, the length in the width direction is 4 pixels, and the length in the height direction is 8 pixels. The length of the current encoding block in the height direction is used as the target length in a case that the length in the height direction is greater than the length in the width direction, and the target length is 8. The first pixel quantity of target reconstructed pixels are selected from adjacent reconstructed pixels in the height direction of the current encoding block, to form the first reconstructed pixel set. The length corresponding to the first pixel quantity of pixels is less than or equal to 8, or may be 4. Adjacent reconstructed pixels and non-adjacent reconstructed pixels in the width direction of the current encoding block are selected according to the second pixel quantity, and the selected reconstructed pixels are used as the target reconstructed pixels, to form the second reconstructed pixel set. The second pixel may be 4, and is equal to the pixel quantity of the current encoding block in the width direction.

The pixel quantity of the current encoding block in the second direction is a pixel quantity corresponding to the edge in the second direction. When the second direction is the height direction, the pixel quantity corresponding to the edge in the second direction is the pixel quantity corresponding to the edge in the height direction.

The length of the current encoding block in the first direction is used as the target length in a case that the length of the current encoding block in the first direction is greater than the length in the second direction. The length corresponding to the first pixel quantity of pixels is less than or equal to the target length, and the second pixel quantity is greater than or equal to the pixel quantity of the current encoding block in the second direction. Because the adjacent reconstructed pixels in the first direction are greater than or equal to the target length, the first pixel quantity of target reconstructed pixels may be chosen from the adjacent reconstructed pixels in the first direction. Because the second pixel quantity is greater than or equal to the pixel quantity of the current encoding block in the second direction, adjacent reconstructed pixels in the second direction are less than or equal to the pixel quantity corresponding to the target length. As a result, the quantity of adjacent reconstructed pixels in the second direction is insufficient. Therefore, the adjacent reconstructed pixels and the non-adjacent reconstructed pixels in the second direction are used as the target reconstructed pixels.

In an embodiment, for a rectangular encoding block, the reconstructed pixels corresponding to the height direction are reconstructed pixels on another column adjacent to the first column of the current encoding block. The reconstructed pixels corresponding to the width direction are reconstructed pixels on another row adjacent to the first row of the current encoding block.

Figure 7:
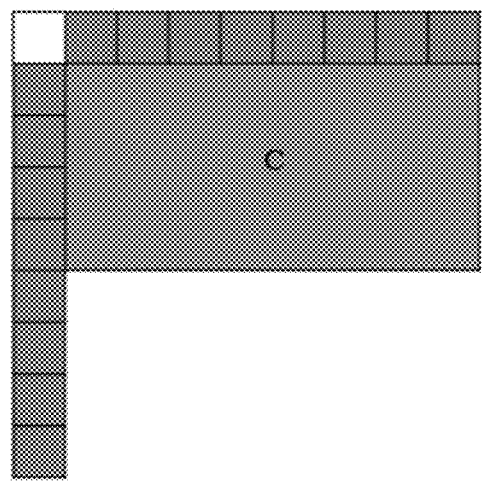
FIG. 7 is a schematic diagram of a current encoding block and corresponding target reference pixels in an embodiment.

In an embodiment, adjacent pixels on the upper side of the first row of pixels in the current encoding block, adjacent pixels on the left side of the first column of pixels, and non-adjacent pixels on the left side of the first column of pixels are used as the target reference pixels. For example, as shown in FIG. 7, it is assumed that the current encoding block is a rectangular encoding block C in FIG. 7, the rectangular encoding block has a height of four pixels and a width of eight pixels. If the target length is the width, the reconstructed pixel set corresponding to the height direction may be a set formed by eight gray pixels on the left side. A total of five gray pixels, namely, the second pixel to the sixth pixel from top to bottom are adjacent pixels on the left side, and three gray pixels, namely, the seventh pixel to the ninth pixel from top to bottom are non-adjacent pixels. The reconstructed pixel set corresponding to the width direction may be a set formed by eight gray adjacent pixels on the upper side. If the current encoding block is a rectangular encoding block, the length corresponding to the width direction of the current encoding block is greater than the length corresponding to the height direction, w+w is the $q^{th}$ power of the target numeral system, and q is a positive integer. In this case, the length corresponding to the width direction may be used as the target length. The first pixel quantity and the second pixel quantity are obtained according to the length corresponding to the width direction, the shift bit number corresponding to the pixel statistical value is obtained according to the length corresponding to the width direction, and the predicted value of the current encoding block is obtained according to the pixel statistical value and the shift bit number. For example, if the first pixel quantity and the second pixel quantity are equal to the target length, a calculation formula of the predicted value of the current encoding block may be shown in Formula (7), where $\log_a(w+w)$ is the right shift bit number, and is also q. Other parameters in Formula (7) are similar to the parameters in Formula (5), and the parameters also correspond to similar meanings. Details are not described herein again.

$$DCvalue = \left(\sum_0^{w-1} p(x, -1) + \sum_0^{w-1} p(-1, y) + b\right) \gg \log_a(w + w) \tag{7}$$

In an embodiment, the adjacent pixels on the left side of the first column of pixels in the current encoding block, the adjacent pixels on the upper side of the first row of pixels, and the non-adjacent pixels on the upper side of the first row of pixels may be used as the target reference pixels. If the current encoding block is the rectangular encoding block, the length corresponding to the height direction of the current encoding block is greater than the length corresponding to the width direction, h+h is the $g^{th}$ power of the target numeral system, and g is a positive integer. The length corresponding to the height direction may be used as the target length. The first pixel quantity and the second pixel quantity are obtained according to the length corresponding to the height direction, the shift bit number corresponding to the pixel statistical value is obtained according to the length corresponding to the height direction, and the predicted value of the current encoding block is obtained according to the pixel statistical value and the shift bit number. For example, if the first pixel quantity and the second pixel quantity are equal to the target length, a calculation formula of the predicted value of the current encoding block may be shown in Formula (8), where $\log_a(h+h)$ is the right shift bit number, and is also g. Other parameters in Formula (8) are similar to the parameters in Formula (5), and the parameters also correspond to similar meanings. Details are not described herein again.

$$DCvalue = \left(\sum_0^{h-1} p(x, -1) + \sum_0^{h-1} p(-1, y) + b\right) \gg \log_a(h + h) \tag{8}$$

In an embodiment, when the length of the current encoding block in the first direction is used as the target length in a case that the length of the current encoding block in the first direction is less than the length in the second direction, step S606, that is, the selecting the first pixel quantity of target reconstructed pixels from reconstructed pixels in the first direction of the current encoding block, to form the first reconstructed pixel set includes: selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length. Step S608, that is, the selecting the second pixel quantity of target reconstructed pixels in the second direction of the current encoding block, to form the second reconstructed pixel set includes: selecting the second pixel quantity of target reconstructed pixels from adjacent reconstructed pixels in the first direction of the current encoding block according to the second pixel quantity, to form the second reconstructed pixel set, the second pixel quantity being less than a pixel quantity of the current encoding block in the second direction.

When the length corresponding to the direction with the shorter length is selected as the target length, the length corresponding to the first pixel quantity of pixels is less than or equal to the target length, and the second pixel quantity is less than the pixel quantity of the current encoding block in the second direction, the adjacent reconstructed pixels in the first direction are greater than or equal to the target length, so that the first pixel quantity of target reconstructed pixels may be chosen from the adjacent reconstructed pixels in the first direction. Because the second pixel quantity is less than the pixel quantity of the current encoding block in the second direction, the adjacent reconstructed pixels in the second direction are also greater than the pixel quantity corresponding to the target length. Therefore, the second pixel quantity of target reconstructed pixels may be chosen from the adjacent reconstructed pixels in the second direction. Because an adjacent pixel is more likely to be similar to a pixel in the current encoding block, the predicted value may be closer to the actual value, thereby reducing the prediction residual.

In an embodiment, the adjacent pixels on the left side of the first column of pixels in the current encoding block and some adjacent pixels on the upper side of the first row of pixels may be used as the target reference pixels. A quantity of target reference pixels on the upper side of the first row of pixels may be the same as that of pixels in the height direction. When some pixels on the upper side of the first row of pixels are selected, the some pixels may be selected according to a preset rule. For example, selection may be performed in one or more manners of left-to-right selection, right-to-left selection, and interval selection.

In an embodiment, if the current encoding block is a rectangular encoding block, the length corresponding to the direction with the shorter length is selected as the target length, the length corresponding to the width direction of the current encoding block is greater than the length corresponding to the height direction, h+h is the $L^{th}$ power of the target numeral system, and L is a positive integer. In this case, the length corresponding to the height direction of the current encoding block may be selected as the target length. The first pixel quantity and the second pixel quantity are obtained according to the length corresponding to the height direction, the shift bit number corresponding to the pixel statistical value is obtained according to the length corresponding to the height direction, and the predicted value of the current encoding block is obtained according to the pixel statistical value and the shift bit number.

For example, if the first pixel quantity and the second pixel quantity are equal to the target length h, a calculation formula of the predicted value of the current encoding block is shown in Formula (9) or Formula (10) below. For example, it is assumed that the current encoding block is a rectangular encoding block C in FIG. 8 or FIG. 9, the rectangular encoding block has a height of four pixels and a width of eight pixels. In this case, the reconstructed pixel set corresponding to the height direction in FIG. 8 may be a set formed by four gray pixels on the left side, and the reconstructed pixel set corresponding to the width direction may be a set formed by four gray pixels on the upper portion located on the left side. The reconstructed pixel set corresponding to the height direction in FIG. 9 may be a set formed by four gray pixels on the left side, and the reconstructed pixel set corresponding to the width direction may be a set formed by four gray pixels on the upper portion located on the right side. Parameters in Formula (9) and Formula (10) are similar to the parameters in Formula (5), and the parameters also correspond to similar meanings. Details are not described herein again.

$$\text{DCvalue} = \left(\sum_{0}^{h-1} p(x, -1) + \sum_{0}^{h-1} p(-1, y) + b\right) \gg \log_a(h+h) \qquad (9)$$

$$\text{DCvalue} = \left(\sum_{w-h}^{w-1} p(x, -1) + \sum_{0}^{h-1} p(-1, y) + b\right) \gg \log_a(h+h) \qquad (10)$$

In an embodiment, adjacent pixels on the upper side of the first row of pixels in the current encoding block and some adjacent pixels on the left side of the first column of pixels may be used as the target reference pixels. A quantity of some adjacent pixels on the left side of the first column of pixels may be the same as that of the pixels in the width direction. When the some pixels on the left side of the first column of pixels are selected, the some pixels may be selected according to a preset rule. For example, selection may be performed in one or more manners of top-to-bottom selection, bottom-to-top selection, and interval selection.

If the current encoding block is a rectangular encoding block, the length corresponding to the direction with the shorter length is selected as the target length, the length corresponding to the height direction of the current encoding block is greater than the length corresponding to the width direction, w+w is the $z^{th}$ power of the target numeral system, and z is a positive integer. In this case, the length corresponding to the width direction of the current encoding block may be selected as the target length. The first pixel quantity and the second pixel quantity are obtained according to the length corresponding to the width direction, the shift bit number corresponding to the pixel statistical value is obtained according to the first pixel quantity and the second pixel quantity, and the predicted value of the current encoding block is obtained according to the pixel statistical value and the shift bit number.

For example, if the first pixel quantity and the second pixel quantity are equal to the target length h, a calculation formula of the predicted value of the current encoding block may be shown in Formula (11) or Formula (12) below. In Formula (11), for the reference pixels corresponding to the height direction, upper w adjacent pixels on the left side of the first column of pixels are selected and are used as the target reference pixels. In Formula (12), for the reference pixels corresponding to the height direction, lower w adjacent pixels on the left side of the first column of pixels are selected and are used as the target reference pixels.

$$DC \text{value} = \left( \sum_{0}^{w-1} p(x, -1) + \sum_{0}^{w-1} p(-1, y) + b \right) \gg \log_a(w+w) \quad (11)$$

$$DC \text{value} = \left( \sum_{0}^{w-1} p(x, -1) + \sum_{h-w}^{h-1} p(-1, y) + b \right) \gg \log_a(w+w) \quad (12)$$

It may be understood that, for intra-frame encoding, general encoding directions are from left to right and from top to bottom. Therefore, calculations may be performed by using Formula (5) to Formula (12). If the encoding direction is from right to left, p(x, −1) in Formula (5) to Formula (12) may be replaced with p(x, 1). If the encoding direction is from bottom to top, p(−1, y) in Formula (5) may be replaced with p(1, y).

Figure 10:
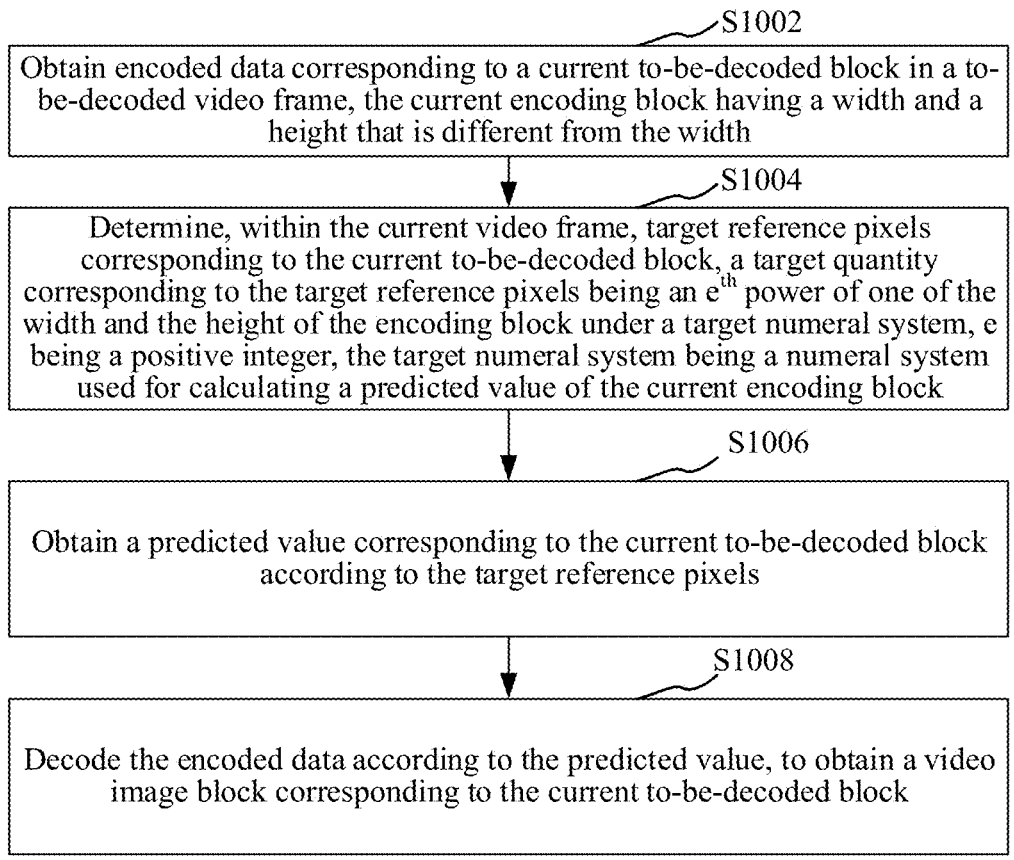
FIG. 10 is a flowchart of a video decoding method in an embodiment.

As shown in FIG. 10, in an embodiment, a video decoding method is provided. The video decoding method provided in this embodiment may be applied to the terminal 110 or the server 120 in FIG. 1. The method may include the following steps:

Step S1002. Obtain encoded data corresponding to a current to-be-decoded block in a to-be-decoded video frame. In some embodiments, the width and height of the current encoding block may be different from each other. In some other embodiments, the width and height of the current encoding block may be the same.

The to-be-decoded video frame is a video frame that needs to be decoded. One to-be-decoded video frame sequence may include a plurality of to-be-decoded video frames. The to-be-decoded video frame may be a video frame obtained in real time, or may be a video frame obtained from a prestored to-be-decoded video frame sequence. The current to-be-decoded video frame is a video frame that currently needs to be decoded, and the current to-be-decoded block is a to-be-decoded block that currently needs to be decoded in the current to-be-decoded video frame. The video frame may include one or more to-be-decoded blocks. It may be understood that, during decoding, because the encoding blocks are in a one-to-one correspondence with the to-be-decoded blocks, the encoded data corresponding to the current to-be-decoded blocks is encoded data obtained by encoding corresponding current encoding blocks. Therefore, the size of the encoding block is consistent with that of the to-be-decoded block, and the sizes of pixels in the to-be-decoded blocks may alternatively include 32*32 pixels, 16*16 pixels, 8*8 pixels, 4*4 pixels or the like.

Step S1004. Determine, within the current video frame, target reference pixels corresponding to the current to-be-decoded block, a target quantity corresponding to the target reference pixels being the e-th power of one of the width and the height of the encoding block under a target numeral system, e being a positive integer, the target numeral system being a numeral system used for calculating a predicted value of the current encoding block.

It may be understood that, because of the consistency between the encoding principle and decoding principle, for the corresponding current encoding block and current to-be-decoded block, the target reference pixels are the same. Therefore, the step of obtaining target reference pixels by the decoding end, reference may be made to the step of obtaining target reference pixels in the video encoding method. Details are not described herein again.

Step S1006. Obtain a predicted value corresponding to the current to-be-decoded block according to the target reference pixels.

It may be understood that, because of the consistency between the encoding principle and decoding principle, for the corresponding current encoding block and current to-be-decoded block, a corresponding calculation method of the predicted value is used. Therefore, for the step of obtaining a predicted value corresponding to the current to-be-decoded block by the decoding end, reference may be made to the step of obtaining a predicted value corresponding to the current encoding block in the video encoding method. Details are not described herein again.

In an embodiment, the determining target reference pixels corresponding to the current to-be-decoded block includes: obtaining a first reconstructed pixel set in a first direction and a second reconstructed pixel set in a second direction of the current to-be-decoded block, and using reconstructed pixels in the first reconstructed pixel set and the second reconstructed pixel set as the target reference pixels, a sum of a quantity of pixels in the first reconstructed pixel set and a quantity of pixels in the second reconstructed pixel set being equal to the target quantity.

In an embodiment, the determining target reference pixels corresponding to the current to-be-decoded block includes: obtaining a first reconstructed pixel set in a first direction and a second reconstructed pixel set in a second direction of the current to-be-decoded block; obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

The obtaining a duplicate pixel set according to at least one of the first reconstructed pixel set and the second reconstructed pixel set may include: obtaining the duplicate pixel set according to the reconstructed pixels in the first reconstructed pixel set; or obtaining the duplicate pixel set according to the reconstructed pixels in the second reconstructed pixel set; or obtaining the duplicate pixel set according to the reconstructed pixels in the first reconstructed pixel set and the second reconstructed pixel set.

In an embodiment, the step S1006, that is, the obtaining a predicted value corresponding to the current to-be-decoded block according to the target reference pixels includes: performing a summation operation on pixel values of the target reference pixels, to obtain a pixel statistical value; and obtaining a shift bit number according to the target quantity, performing shift calculation according to the shift bit number and the pixel statistical value, to obtain a shift result, and obtaining the predicted value corresponding to the current to-be-decoded block according to the shift result.

Step S1008. Decode the encoded data according to the predicted value, to obtain a video image block corresponding to the current to-be-decoded block.

After the predicted value is obtained, pixel values of a video image block are obtained according to the sum of the prediction residual in the encoded data and the predicted value. A decoding process may be determined according to an encoding process. For example, the decoding process may include at least one of inverse transformation, inverse quantization, and entropy decoding.

According to the foregoing video decoding method, a prediction may be performed by obtaining target reference pixels whose quantity is the same as the e-th power of a target numeral system, and the target numeral system is a system used for calculating the predicted value. When the prediction is performed by using the target reference pixels, a pixel average value of the target reference pixels needs to be obtained. That is, a sum of pixel values of the target reference pixels is divided by a target quantity, to obtain the pixel average value. If the target quantity is the e-th power of the target numeral system, a shift operation may be used, and a division operation is avoided. Therefore, the calculation speed of calculating a predicted value during video encoding can be increased, and the encoding efficiency is improved.

In an embodiment, the obtaining a first reconstructed pixel set in a first direction and a second reconstructed pixel set in a second direction that correspond to the current encoding block may include: using the length of the current to-be-decoded block in the first direction or the second direction as a target length; determining a first pixel quantity and a second pixel quantity according to the target length, a sum of the first pixel quantity and the second pixel quantity being equal to the target quantity; selecting the first pixel quantity of target reconstructed pixels from reconstructed pixels in the first direction of the current to-be-decoded block, to form the first reconstructed pixel set; and selecting the second pixel quantity of target reconstructed pixels in the second direction of the current to-be-decoded block, to form the second reconstructed pixel set.

In an embodiment, the using the length of the current to-be-decoded block in the first direction or the second direction as a target length includes: using the length of the current to-be-decoded block in the first direction as the target length in a case that the length of the current to-be-decoded block in the first direction is greater than the length in the second direction.

The selecting the first pixel quantity of target reconstructed pixels from reconstructed pixels in the first direction of the current to-be-decoded block, to form the first reconstructed pixel set includes: selecting the first pixel quantity of target reconstructed pixels from adjacent reconstructed pixels in the first direction of the current to-be-decoded block, to form the first reconstructed pixel set, a length corresponding to the first pixel quantity of pixels being less than or equal to the target length; and the selecting the second pixel quantity of target reconstructed pixels in the second direction of the current to-be-decoded block, to form the second reconstructed pixel set includes: selecting adjacent reconstructed pixels and non-adjacent reconstructed pixels in the second direction of the current to-be-decoded block according to the second pixel quantity, and using the selected reconstructed pixels as the target reconstructed pixels, to form the second reconstructed pixel set, the second pixel quantity being greater than or equal to a pixel quantity of the current to-be-decoded block in the second direction.

In an embodiment, the using the length of the current to-be-decoded block in the first direction or the second direction as a target length includes: using the length of the current to-be-decoded block in the first direction as the target length in a case that the length of the current to-be-decoded block in the first direction is less than the length in the second direction.

The selecting the first pixel quantity of target reconstructed pixels from reconstructed pixels in the first direction of the current to-be-decoded block, to form the first reconstructed pixel set includes: selecting the first pixel quantity of target reconstructed pixels from adjacent reconstructed pixels in the first direction of the current to-be-decoded block, to form the first reconstructed pixel set, a length corresponding to the first pixel quantity of pixels being less than or equal to the target length; and the selecting the second pixel quantity of target reconstructed pixels in the second direction of the current to-be-decoded block, to form the second reconstructed pixel set includes: selecting the second pixel quantity of target reconstructed pixels from adjacent reconstructed pixels in the first direction of the current to-be-decoded block according to the second pixel quantity, to form the second reconstructed pixel set, the second pixel quantity being less than a pixel quantity of the current to-be-decoded block in the second direction.

The video encoding method and the video decoding method provided in this embodiment of this application are described below by using an embodiment. It is assumed that, the current encoding block has a width of eight pixels and a height of four pixels, and the target numeral system is the binary system.

1. The encoding end obtains a current video frame in a video frame sequence, and it is assumed that the current video frame is the third video frame, and the first two video frames are encoded. The current video frame is divided, and it is assumed that the current video frame is divided into 16 encoding blocks. The first nine encoding blocks have been encoded, and therefore, the tenth encoding block is used as the current encoding block. For example, the encoding blocks C in FIG. 5B, and FIG. 7 to FIG. 9 may be used as the current encoding blocks.

2. The encoding end determines a prediction mode of the current encoding block. If the prediction mode is a DC prediction mode, step 3 is performed. Otherwise, video encoding is performed according to the video encoding method corresponding to another prediction mode. For example, if the prediction mode of the current encoding block is an inter-frame prediction mode, inter-frame prediction encoding is performed.

Figure 8:
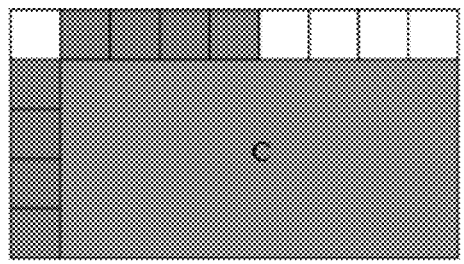
FIG. 8 is a schematic diagram of a current encoding block and corresponding target reference pixels in an embodiment.
Figure 9:
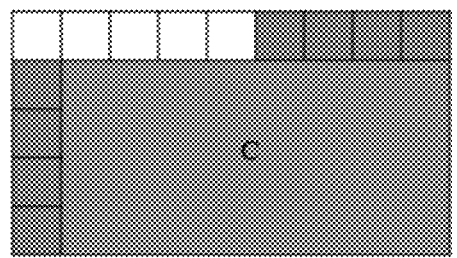
FIG. 9 is a schematic diagram of a current encoding block and corresponding target reference pixels in an embodiment.

3. The encoding end determines target reference pixels corresponding to the current encoding block. For example, in FIG. 7 to FIG. 9, gray pixels on the left side and the upper side of the current encoding block are used as the target reference pixels. In FIG. 7, a quantity of target reference pixels is 8+8=16. In FIG. 8 and FIG. 9, a quantity of target reference pixels is 4+4=8. In FIG. 5B, both pixels on the left side and the upper side of the current encoding block and pixels obtained by duplicating the pixels on the left side are used as the target reference pixels, and a quantity of target reference pixels is 8+4*2=16. In this way, a quantity of target reference pixels is the fourth power of the binary system.

4. The encoding end performs a summation operation on pixel values of the target reference pixels, to obtain a pixel statistical value. In a possible implementation, the pixel values of the target reference pixels are added, to obtain a sum of the pixel values and use the sum as the pixel statistical value.

5. The encoding end obtains a shift bit number according to the target quantity, performs shift calculation according to the shift bit number and the pixel statistical value, to obtain a shift result, and obtains the predicted value corresponding to the current encoding block according to the shift result. The target numeral system is used as the base of a logarithmic function, and the target quantity is used as an independent variable, to calculate the shift bit number. For example, if a quantity of target reference pixels is 16, a shift bit number is $\log_2 16$, that is, 4, and the shift direction is right. If the pixel statistical value is 1100000 (the binary system), 1100000 (the binary system) is shifted to the right by four bits.

6. The encoding end performs video encoding on the current encoding block according to the predicted value, to obtain encoded data.

7. The encoding end transmits the encoded data to the decoding end through a channel, and the decoding end obtains the encoded data corresponding to the current to-be-decoded block.

8. If the decoding end determines, according to the encoded data, that the current encoding block is in the DC prediction mode, step 9 is performed. Otherwise, the video decoding method corresponding to another prediction mode is used for video decoding.

9. The decoding end determines target reference pixels corresponding to the current to-be-decoded block.

10. The decoding end performs a summation operation on pixel values of the target reference pixels, to obtain a pixel statistical value.

11. The decoding end obtains a shift bit number according to the target quantity, performs shift calculation according to the shift bit number and the pixel statistical value, to obtain a shift result, and obtains the predicted value corresponding to the current to-be-decoded block according to the shift result.

12. The decoding end decodes the encoded data according to the predicted value, to obtain a video image block corresponding to the current to-be-decoded block.

Figure 11:
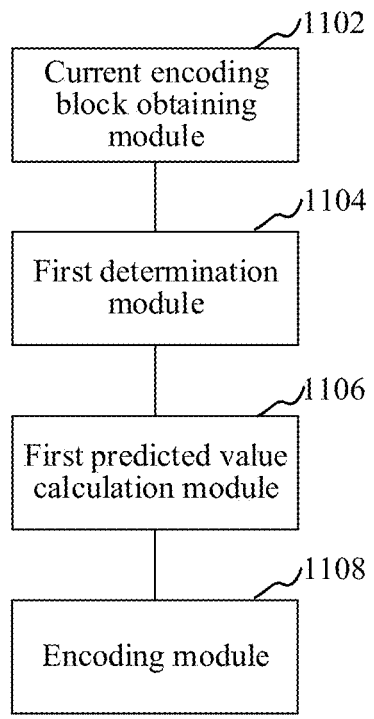
FIG. 11 is a structural block diagram of a video encoding apparatus in an embodiment.

As shown in FIG. 11, in an embodiment, a video encoding apparatus is provided. The video encoding apparatus may be integrated in the foregoing terminal 110 or the server 120, and may include a current encoding block obtaining module 1102, a first determination module 1104, a first predicted value calculation module 1106, and an encoding module 1108. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

The current encoding block obtaining module 1102 is configured to obtain a current encoding block to be encoded in a current video frame.

The first determination module 1104 is configured to determine target reference pixels corresponding to the current encoding block, a target quantity corresponding to the target reference pixels being the e-th power of a target numeral system, e being a positive integer, the target numeral system being a system used for calculating a predicted value of the current encoding block.

The first predicted value calculation module 1106 is configured to obtain a predicted value corresponding to the current encoding block according to the target reference pixels.

The encoding module 1108 is configured to perform video encoding on the current encoding block according to the predicted value, to obtain encoded data.

In an embodiment, the first predicted value calculation module 1106 is configured to: perform a summation operation on pixel values of the target reference pixels, to obtain a pixel statistical value; and obtain a shift bit number according to the target quantity, perform shift calculation according to the shift bit number and the pixel statistical value, to obtain a shift result, and obtain the predicted value corresponding to the current encoding block according to the shift result.

In an embodiment, the first determination module 1104 is configured to: obtain a first reconstructed pixel set in a first direction and a second reconstructed pixel set in a second direction that correspond to the current encoding block, and use reconstructed pixels in the first reconstructed pixel set and the second reconstructed pixel set as the target reference pixels, a sum of a quantity of reconstructed pixels in the first reconstructed pixel set and a quantity of reconstructed pixels in the second reconstructed pixel set being equal to the target quantity.

In an embodiment, the first determination module 1104 includes:

a first reconstructed pixel set obtaining module, configured to obtain a first reconstructed pixel set in a first direction and a second reconstructed pixel set in a second direction that correspond to the current encoding block;

a first duplication unit, configured to obtain a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and a first pixel determination unit, configured to use reconstructed pixels in the first reconstructed pixel set, the second reconstructed pixel set, and the duplicate pixel set as the target reference pixels.

In an embodiment, the reconstructed pixel set obtaining module includes:

a length determination unit, configured to use the length of the current encoding block in the first direction or the second direction as a target length;

a quantity determination unit, configured to determine a first pixel quantity and a second pixel quantity according to the target length, a sum of the first pixel quantity and the second pixel quantity being equal to the target quantity;

a first selection unit, configured to select the first pixel quantity of target reconstructed pixels from reconstructed pixels in the first direction of the current encoding block, to form the first reconstructed pixel set; and a second selection unit, configured to select the second pixel quantity of target reconstructed pixels in the second direction of the current encoding block, to form the second reconstructed pixel set.

In an embodiment, the length determination unit is configured to: use the length of the current encoding block in the first direction as the target length in a case that the length of the current encoding block in the first direction is greater than the length in the second direction.

The first selection unit is configured to: select the first pixel quantity of target reconstructed pixels from adjacent reconstructed pixels in the first direction of the current encoding block, to form the first reconstructed pixel set, a length corresponding to the first pixel quantity of pixels being less than or equal to the target length.

The second selection unit is configured to: select adjacent reconstructed pixels and non-adjacent reconstructed pixels in the second direction of the current encoding block according to the second pixel quantity, and using the selected reconstructed pixels as the target reconstructed pixels, to form the second reconstructed pixel set, the second pixel quantity being greater than a pixel quantity of the current encoding block in the second direction.

In an embodiment, the length determination unit is configured to use the length of the current encoding block in the first direction as the target length in a case that the length of the current encoding block in the first direction is less than the length in the second direction.

The first selection unit is configured to select the first pixel quantity of target reconstructed pixels from adjacent reconstructed pixels in the first direction of the current encoding block, to form the first reconstructed pixel set, a length corresponding to the first pixel quantity of pixels being less than or equal to the target length.

The second selection unit is configured to select the second pixel quantity of target reconstructed pixels from adjacent reconstructed pixels in the first direction of the current encoding block according to the second pixel quantity, to form the second reconstructed pixel set, the second pixel quantity being less than a pixel quantity of the current encoding block in the second direction.

Figure 12:
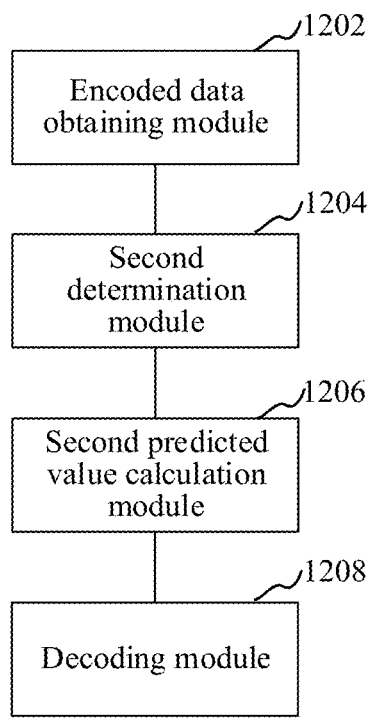
FIG. 12 is a structural block diagram of a video decoding apparatus in an embodiment.

As shown in FIG. 12, in an embodiment, a video decoding apparatus is provided. The video decoding apparatus may be integrated in the foregoing terminal 110 or the server 120, and the terminal 110 or the server 120 may include an encoded data obtaining module 1202, a second determination module 1204, a second predicted value calculation module 1206, and a decoding module 1208.

The encoded data obtaining module 1202 is configured to obtain encoded data corresponding to a current to-be-decoded block in a to-be-decoded video frame.

The second determination module 1204 is configured to determine target reference pixels corresponding to the current to-be-decoded block, a target quantity corresponding to the target reference pixels being the e-th power of a target numeral system, e being a positive integer, the target numeral system being a system used for calculating a predicted value of the current encoding block.

The second predicted value calculation module 1206 is configured to obtain a predicted value corresponding to the current to-be-decoded block according to the target reference pixels.

The decoding module 1208 is configured to decode the encoded data according to the predicted value, to obtain a video image block corresponding to the current to-be-decoded block.

In an embodiment, the second predicted value calculation module 1206 is configured to: perform a summation operation on pixel values of the target reference pixels, to obtain a pixel statistical value; and obtain a shift bit number according to the target quantity, perform shift calculation according to the shift bit number and the pixel statistical value, to obtain a shift result, and obtain the predicted value corresponding to the current to-be-decoded block according to the shift result.

In an embodiment, the second determination module 1204 is configured to: obtain a first reconstructed pixel set in a first direction and a second reconstructed pixel set in a second direction of the current to-be-decoded block, and use reconstructed pixels in the first reconstructed pixel set and the second reconstructed pixel set as the target reference pixels, a sum of a quantity of pixels in the first reconstructed pixel set and a quantity of pixels in the second reconstructed pixel set being equal to the target quantity.

In an embodiment, the second determination module 1204 includes:

a second reconstructed pixel set obtaining unit, configured to obtain a first reconstructed pixel set in a first direction and a second reconstructed pixel set in a second direction of the current to-be-decoded block;

a second duplication unit, configured to obtain a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and a second pixel determination unit, configured to use reconstructed pixels in the first reconstructed pixel set, the second reconstructed pixel set, and the duplicate pixel set as the target reference pixels.

Figure 13:
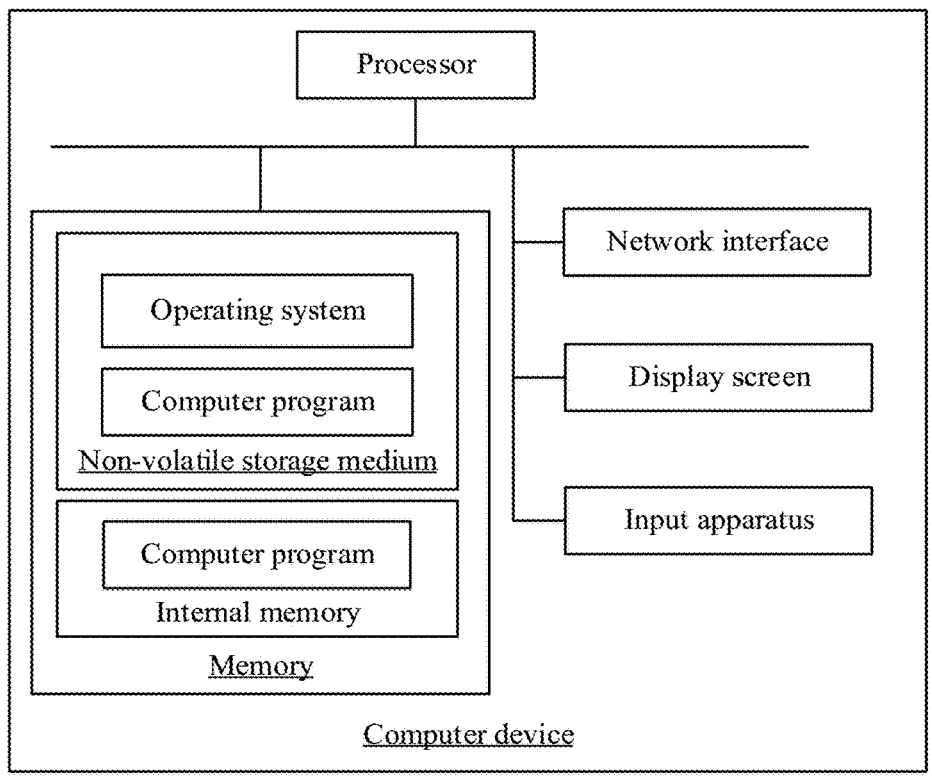
FIG. 13 is a block diagram of the internal structure of a computer device in an embodiment.

FIG. 13 is a diagram of the internal structure of a computer device in an embodiment. The computer device may be the terminal 110 in FIG. 1. As shown in FIG. 13, the computer device includes a processor, a memory, a network interface, an input apparatus, and a display screen that are connected by a system bus. The memory includes a non-volatile storage medium and an internal memory. The non-volatile storage medium of the computer device stores an operating system, and may further store a computer program. The computer program, when executed by the processor, may cause the processor to implement at least one of the video encoding method and the video decoding method. The internal memory may also store a computer program. When being executed by the processor, the computer program may cause the processor to perform at least one of the video encoding method and the video decoding method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse, or the like.

Figure 14:
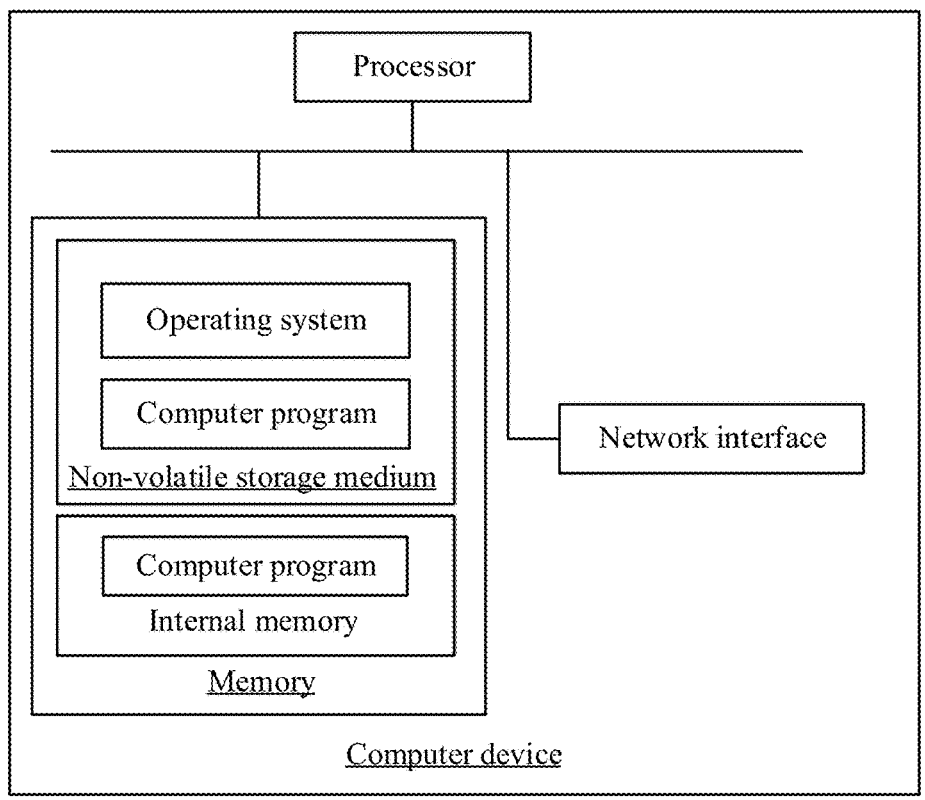
FIG. 14 is a block diagram of the internal structure of a computer device in an embodiment.

FIG. 14 is a diagram of the internal structure of a computer device in an embodiment. The computer device may be the server 120 in FIG. 1. As shown in FIG. 14, the computer device includes a processor, a memory, and a network interface that are connected by a system bus. The memory includes a non-volatile storage medium and an internal memory. The non-volatile storage medium of the computer device stores an operating system, and may further store a computer program. The computer program, when executed by the processor, may cause the processor to implement at least one of the video encoding method and the video decoding method. The internal memory may also store a computer program. When being executed by the processor, the computer program may cause the processor to perform at least one of the video encoding method and the video decoding method.

A person skilled in the art may understand that the structures shown in FIG. 13 and FIG. 14 are only block diagrams of a partial structure related to the solution of this application, and do not constitute a limitation to the computer device to which the solution of this application is applied. The computer device may include more or fewer components than those shown in figures, or some components may be combined, or different component deployment may be used.

In an embodiment, the video encoding apparatus provided in this application may be implemented in the form of a computer program. The computer program may run on the computer device shown in FIG. 13 and FIG. 14. The memory of the computer device may store program modules forming the video encoding apparatus, for example, the current encoding block obtaining module 1102, the first determination module 1104, the first predicted value calculation module 1106, and the encoding module 1108 shown in FIG. 11. The computer program formed by the program modules causes the processor to perform the steps of the video encoding method in the embodiments of this application that are described in this specification.

For example, for the computer device shown in FIG. 13 and FIG. 14, the current encoding block obtaining module 1102 in the video encoding apparatus shown in FIG. 11 may obtain a to-be-encoded current encoding block in a current video frame. The first determination module 1104 determines target reference pixels corresponding to the current encoding block, a target quantity corresponding to the target reference pixels being the e-th power of a target numeral system, e being a positive integer, the target numeral system being a system used for calculating a predicted value of the current encoding block. The first predicted value calculation module 1106 obtains a predicted value corresponding to the current encoding block according to the target reference pixels. The encoding module 1108 performs video encoding on the current encoding block according to the predicted value, to obtain encoded data.

In an embodiment, the video decoding apparatus provided in this application may be implemented in the form of a computer program. The computer program may run on the computer device shown in FIG. 13 or FIG. 14. The memory of the computer device may store program modules forming the video decoding apparatus, for example, the encoded data obtaining module 1202, the second determination module 1204, the second predicted value calculation module 1206, and the decoding module 1208 shown in FIG. 12. The computer program formed by the program modules causes the processor to perform the steps of the video decoding method in the embodiments of this application that are described in this specification.

For example, for the computer device shown in FIG. 13 and FIG. 14, the encoded data obtaining module 1202 in the video decoding apparatus shown in FIG. 12 may obtain encoded data corresponding to a current to-be-decoded block in a to-be-decoded video frame. The second determination module 1204 determines target reference pixels corresponding to the current to-be-decoded block, a target quantity corresponding to the target reference pixels being the e-th power of a target numeral system, e being a positive integer, the target numeral system being a system used for calculating a predicted value of the current encoding block. The second predicted value calculation module 1206 obtains a predicted value corresponding to the current to-be-decoded block according to the target reference pixels. The decoding module 1208 decodes the encoded data according to the predicted value, to obtain a video image block corresponding to the current to-be-decoded block.

In an embodiment, a computer device is provided, including a memory and a processor, the memory storing a computer program, the computer program, when executed by the processor, causing the processor to perform the following operations:

obtaining a current encoding block to be encoded in a current video frame, the current encoding block having a width and a height that is different from the width;

determining, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block;

obtaining a predicted value corresponding to the current encoding block according to the target reference pixels; and performing video encoding on the current encoding block according to the predicted value, to obtain encoded data.

In an embodiment, the computer program, when executed by the processor, causes the processor to perform the following steps:

performing a summation operation on pixel values of the target reference pixels, to obtain a pixel statistical value; and obtaining a shift bit number according to the target quantity, performing shift calculation on the pixel statistical value according to the shift bit number, to obtain a shift result of the pixel statistical value, and obtaining the predicted value corresponding to the current encoding block according to the shift result.

In an embodiment, the computer program, when executed by the processor, causes the processor to perform the following steps:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block, and using reconstructed pixels in the first reconstructed pixel set and the second reconstructed pixel set as the target reference pixels, a sum of a quantity of reconstructed pixels in the first reconstructed pixel set and a quantity of reconstructed pixels in the second reconstructed pixel set being equal to the target quantity.

In an embodiment, the computer program, when executed by the processor, causes the processor to perform the following steps:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block;

obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

In an embodiment, the computer program, when executed by the processor, causes the processor to perform the following steps:

using the length of the current encoding block in the first direction or the second direction as a target length;

determining a first pixel quantity and a second pixel quantity according to the target length, a sum of the first pixel quantity and the second pixel quantity being equal to the target quantity;

selecting the first pixel quantity of target reconstructed pixels from reconstructed pixels in the first direction of the current encoding block, to form the first reconstructed pixel set; and selecting the second pixel quantity of target reconstructed pixels in the second direction of the current encoding block, to form the second reconstructed pixel set.

In an embodiment, the computer program, when executed by the processor, causes the processor to perform the following steps:

using the length of the current encoding block in the first direction as the target length in a case that the length of the current encoding block in the first direction is greater than the length in the second direction; and the selecting the first pixel quantity of target reconstructed pixels from reconstructed pixels in the first direction of the current encoding block, to form the first reconstructed pixel set includes:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set includes:

selecting adjacent reconstructed pixels and non-adjacent reconstructed pixels in the second direction of the current encoding block according to the second pixel quantity, and using the selected reconstructed pixels as the target reconstructed pixels, to form the second reconstructed pixel set, the second pixel quantity being greater than or equal to a pixel quantity of the current encoding block in the second direction.

In an embodiment, the computer program, when executed by the processor, causes the processor to perform the following steps:

using the length of the current encoding block in the first direction as the target length in a case that the length of the current encoding block in the first direction is less than the length in the second direction; and the selecting the first pixel quantity of target reconstructed pixels from reconstructed pixels in the first direction of the current encoding block, to form the first reconstructed pixel set includes:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set includes:

selecting the second pixel quantity of target reconstructed pixels from adjacent reconstructed pixels in the first direction of the current encoding block according to the second pixel quantity, to form the second reconstructed pixel set, the second pixel quantity being less than a pixel quantity of the current encoding block in the second direction.

In an embodiment, a computer device is provided, including a memory and a processor, the memory storing a plurality of computer programs, the computer programs, when executed by the processor, causing the processor to perform the following operations:

obtaining encoded data corresponding to a current to-be-decoded block in a to-be-decoded video frame, the current encoding block having a width and a height that is different from the width;

determining, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block;

obtaining a predicted value corresponding to the current to-be-decoded block according to the target reference pixels; and decoding the encoded data according to the predicted value, to obtain a video image block corresponding to the current to-be-decoded block.

In an embodiment, the computer program, when executed by the processor, causes the processor to perform the following steps:

performing a summation operation on pixel values of the target reference pixels, to obtain a pixel statistical value; and obtaining a shift bit number according to the target quantity, performing shift calculation on the pixel statistical value according to the shift bit number, to obtain a shift result of the pixel statistical value, and obtaining the predicted value corresponding to the current encoding block according to the shift result.

In an embodiment, the computer program, when executed by the processor, causes the processor to perform the following steps:

obtaining a first reconstructed pixel set in a first direction and a second reconstructed pixel set in a second direction of the current to-be-decoded block, wherein the first direction is one of the width and the height of the current encoding block and the second direction is the other one of the width and the height of the current encoding block, and using reconstructed pixels in the first reconstructed pixel set and the second reconstructed pixel set as the target reference pixels, a sum of a quantity of pixels in the first reconstructed pixel set and a quantity of pixels in the second reconstructed pixel set being equal to the target quantity.

In an embodiment, the computer program, when executed by the processor, causes the processor to perform the following steps:

obtaining a first reconstructed pixel set in a first direction and a second reconstructed pixel set in a second direction of the current to-be-decoded block, wherein the first direction is one of the width and the height of the current encoding block and the second direction is the other one of the width and the height of the current encoding block;

obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

In an embodiment, a non-transitory computer-readable storage medium is provided, storing a plurality of computer programs, the computer programs, when executed by a processor of a computer device, causing the computer device to perform the following steps:

obtaining a current encoding block to be encoded in a current video frame, the current encoding block having a width and a height that is different from the width;

determining, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block;

obtaining a predicted value corresponding to the current encoding block according to the target reference pixels; and performing video encoding on the current encoding block according to the predicted value, to obtain encoded data.

In an embodiment, the computer program, when executed by the processor, causes the processor to perform the following steps:

performing a summation operation on pixel values of the target reference pixels, to obtain a pixel statistical value; and obtaining a shift bit number according to the target quantity, performing shift calculation on the pixel statistical value according to the shift bit number, to obtain a shift result of the pixel statistical value, and obtaining the predicted value corresponding to the current encoding block according to the shift result.

In an embodiment, the computer program, when executed by the processor, causes the processor to perform the following steps:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block, and using reconstructed pixels in the first reconstructed pixel set and the second reconstructed pixel set as the target reference pixels, a sum of a quantity of reconstructed pixels in the first reconstructed pixel set and a quantity of reconstructed pixels in the second reconstructed pixel set being equal to the target quantity.

In an embodiment, the computer program, when executed by the processor, causes the processor to perform the following steps:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block;

obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

In an embodiment, the computer program, when executed by the processor, causes the processor to perform the following steps:

using the length of the current encoding block in the first direction or the second direction as a target length;

determining a first pixel quantity and a second pixel quantity according to the target length, a sum of the first pixel quantity and the second pixel quantity being equal to the target quantity;

selecting the first pixel quantity of target reconstructed pixels from reconstructed pixels in the first direction of the current encoding block, to form the first reconstructed pixel set; and selecting the second pixel quantity of target reconstructed pixels in the second direction of the current encoding block, to form the second reconstructed pixel set.

In an embodiment, the computer program, when executed by the processor, causes the processor to perform the following steps:

using the length of the current encoding block in the first direction as the target length in a case that the length of the current encoding block in the first direction is greater than the length in the second direction; and the selecting the first pixel quantity of target reconstructed pixels from reconstructed pixels in the first direction of the current encoding block, to form the first reconstructed pixel set includes:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set includes:

selecting adjacent reconstructed pixels and non-adjacent reconstructed pixels in the second direction of the current encoding block according to the second pixel quantity, and using the selected reconstructed pixels as the target reconstructed pixels, to form the second reconstructed pixel set, the second pixel quantity being greater than or equal to a pixel quantity of the current encoding block in the second direction.

In an embodiment, the computer program, when executed by the processor, causes the processor to perform the following steps:

using the length of the current encoding block in the first direction as the target length in a case that the length of the current encoding block in the first direction is less than the length in the second direction; and the selecting the first pixel quantity of target reconstructed pixels from reconstructed pixels in the first direction of the current encoding block, to form the first reconstructed pixel set includes:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set includes:

selecting the second pixel quantity of target reconstructed pixels from adjacent reconstructed pixels in the first direction of the current encoding block according to the second pixel quantity, to form the second reconstructed pixel set, the second pixel quantity being less than a pixel quantity of the current encoding block in the second direction.

In an embodiment, the computer program, when executed by the processor, causes the processor to perform the following steps:

obtaining encoded data corresponding to a current to-be-decoded block in a to-be-decoded video frame, the current encoding block having a width and a height that is different from the width;

determining target reference pixels corresponding to the current to-be-decoded block, a target quantity corresponding to the target reference pixels being the e-th power of one of the width and the height of the encoding block under a target numeral system, e being a positive integer, the target numeral system being a numeral system used for calculating a predicted value of the current encoding block;

obtaining a predicted value corresponding to the current to-be-decoded block according to the target reference pixels; and decoding the encoded data according to the predicted value, to obtain a video image block corresponding to the current to-be-decoded block.

In an embodiment, the computer program, when executed by the processor, causes the processor to perform the following steps:

performing a summation operation on pixel values of the target reference pixels, to obtain a pixel statistical value; and obtaining a shift bit number according to the target quantity, performing shift calculation on the pixel statistical value according to the shift bit number, to obtain a shift result of the pixel statistical value, and obtaining the predicted value corresponding to the current to-be-decoded block according to the shift result.

In an embodiment, the computer program, when executed by the processor, causes the processor to perform the following steps:

obtaining a first reconstructed pixel set in a first direction and a second reconstructed pixel set in a second direction of the current to-be-decoded block, wherein the first direction is one of the width and the height of the current encoding block and the second direction is the other one of the width and the height of the current encoding block, and using reconstructed pixels in the first reconstructed pixel set and the second reconstructed pixel set as the target reference pixels, a sum of a quantity of pixels in the first reconstructed pixel set and a quantity of pixels in the second reconstructed pixel set being equal to the target quantity.

In an embodiment, the computer program, when executed by the processor, causes the processor to perform the following steps:

obtaining a first reconstructed pixel set in a first direction and a second reconstructed pixel set in a second direction of the current to-be-decoded block, wherein the first direction is one of the width and the height of the current encoding block and the second direction is the other one of the width and the height of the current encoding block;

obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

It is to be understood that although the steps in the flowcharts of the embodiments of this application are displayed in sequence according to arrows, the steps are not necessarily performed in the sequence indicated by the arrows. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

A person of ordinary skill in the art may understand that all or some of the procedures of the methods in the foregoing embodiments may be implemented by a computer program instructing relevant hardware. The computer program may be stored in a non-volatile computer-readable storage medium. When the program is executed, the procedures of the foregoing method embodiments may be performed. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct rambus dynamic RAM (DRDRAM), and a Rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application, and descriptions thereof are in detail, but cannot be understood as a limitation to the patent scope of this application. A person of ordinary skill in the art may further make variations and improvements without departing from the ideas of this application, and the variations and improvements shall fall within the protection scope of this application. Therefore, the protection scope of the patent of this application is to be subject to the appended claims.

What is claimed is:

1. A video encoding method, applied to a computer device having a processor and memory storing a plurality of computer programs to be executed by the processor, the method comprising:

obtaining a current encoding block to be encoded in a current video frame, the current encoding block having a width and a height that is different from the width;

determining, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block;

obtaining a predicted value corresponding to the current encoding block according to the target reference pixels; and performing video encoding on the current encoding block according to the predicted value, to obtain encoded data.

2. The method according to claim 1, wherein the obtaining a predicted value corresponding to the current encoding block according to the target reference pixels comprises:

performing a summation operation on pixel values of the target reference pixels, to obtain a pixel statistical value; and obtaining a shift bit number according to the target quantity, performing shift calculation on the pixel statistical value according to the shift bit number, to obtain a shift result of the pixel statistical value, and obtaining the predicted value corresponding to the current encoding block according to the shift result.

3. The method according to claim 1, wherein the determining, within the current video frame, target reference pixels corresponding to the current encoding block comprises:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block; and using reconstructed pixels in the first reconstructed pixel set and the second reconstructed pixel set as the target reference pixels, a sum of a quantity of reconstructed pixels in the first reconstructed pixel set and a quantity of reconstructed pixels in the second reconstructed pixel set being equal to the target quantity.

4. The method according to claim 1, wherein the determining, within the current video frame, target reference pixels corresponding to the current encoding block comprises:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block;

obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

5. The method according to claim 3, wherein the obtaining a first reconstructed pixel set in a first direction and a second reconstructed pixel set in a second direction that correspond to the current encoding block comprises:

using a length of the current encoding block in the first direction or the second direction as a target length;

determining a first pixel quantity and a second pixel quantity according to the target length, a sum of the first pixel quantity and the second pixel quantity being equal to the target quantity;

selecting the first pixel quantity of target reconstructed pixels from reconstructed pixels in the first direction of the current encoding block, to form the first reconstructed pixel set; and selecting the second pixel quantity of target reconstructed pixels in the second direction of the current encoding block, to form the second reconstructed pixel set.

6. The method according to claim 5, wherein the using a length of the current encoding block in the first direction or the second direction as a target length comprises:

using the length of the current encoding block in the first direction as the target length in a case that the length of the current encoding block in the first direction is greater than the length in the second direction; and the selecting the first pixel quantity of target reconstructed pixels from reconstructed pixels in the first direction of the current encoding block, to form the first reconstructed pixel set comprises:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set comprises:

selecting adjacent reconstructed pixels and non-adjacent reconstructed pixels in the second direction of the current encoding block according to the second pixel quantity, and using the selected reconstructed pixels as the target reconstructed pixels, to form the second reconstructed pixel set, the second pixel quantity being greater than or equal to a pixel quantity of the current encoding block in the second direction.

7. The method according to claim 5, wherein the using a length of the current encoding block in the first direction or the second direction as a target length comprises:

using the length of the current encoding block in the first direction as the target length in a case that the length of the current encoding block in the first direction is less than the length in the second direction; and the selecting the first pixel quantity of target reconstructed pixels from reconstructed pixels in the first direction of the current encoding block, to form the first reconstructed pixel set comprises:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set comprises:

selecting the second pixel quantity of target reconstructed pixels from adjacent reconstructed pixels in the first direction of the current encoding block according to the second pixel quantity, to form the second reconstructed pixel set, the second pixel quantity being less than a pixel quantity of the current encoding block in the second direction.

8. A computer device, comprising a memory and a processor, the memory storing a plurality of computer programs, the computer programs, when executed by the processor, causing the computer device to perform a plurality of operations including:

obtaining a current encoding block to be encoded in a current video frame, the current encoding block having a width and a height that is different from the width;

determining, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block;

obtaining a predicted value corresponding to the current encoding block according to the target reference pixels; and performing video encoding on the current encoding block according to the predicted value, to obtain encoded data.

9. The computer device according to claim 8, wherein the obtaining a predicted value corresponding to the current encoding block according to the target reference pixels comprises:

performing a summation operation on pixel values of the target reference pixels, to obtain a pixel statistical value; and obtaining a shift bit number according to the target quantity, performing shift calculation on the pixel statistical value according to the shift bit number, to obtain a shift result of the pixel statistical value, and obtaining the predicted value corresponding to the current encoding block according to the shift result.

10. The computer device according to claim 8, wherein the determining, within the current video frame, target reference pixels corresponding to the current encoding block comprises:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block; and using reconstructed pixels in the first reconstructed pixel set and the second reconstructed pixel set as the target reference pixels, a sum of a quantity of reconstructed pixels in the first reconstructed pixel set and a quantity of reconstructed pixels in the second reconstructed pixel set being equal to the target quantity.

11. The computer device according to claim 8, wherein the determining, within the current video frame, target reference pixels corresponding to the current encoding block comprises:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block;

obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

12. The computer device according to claim 10, wherein the obtaining a first reconstructed pixel set in a first direction and a second reconstructed pixel set in a second direction that correspond to the current encoding block comprises:

using a length of the current encoding block in the first direction or the second direction as a target length;

determining a first pixel quantity and a second pixel quantity according to the target length, a sum of the first pixel quantity and the second pixel quantity being equal to the target quantity;

selecting the first pixel quantity of target reconstructed pixels from reconstructed pixels in the first direction of the current encoding block, to form the first reconstructed pixel set; and selecting the second pixel quantity of target reconstructed pixels in the second direction of the current encoding block, to form the second reconstructed pixel set.

13. The computer device according to claim 12, wherein the using a length of the current encoding block in the first direction or the second direction as a target length comprises:

using the length of the current encoding block in the first direction as the target length in a case that the length of the current encoding block in the first direction is greater than the length in the second direction; and the selecting the first pixel quantity of target reconstructed pixels from reconstructed pixels in the first direction of the current encoding block, to form the first reconstructed pixel set comprises:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set comprises:

selecting adjacent reconstructed pixels and non-adjacent reconstructed pixels in the second direction of the current encoding block according to the second pixel quantity, and using the selected reconstructed pixels as the target reconstructed pixels, to form the second reconstructed pixel set, the second pixel quantity being greater than or equal to a pixel quantity of the current encoding block in the second direction.

14. The computer device according to claim 12, wherein the using a length of the current encoding block in the first direction or the second direction as a target length comprises:

using the length of the current encoding block in the first direction as the target length in a case that the length of the current encoding block in the first direction is less than the length in the second direction; and the selecting the first pixel quantity of target reconstructed pixels from reconstructed pixels in the first direction of the current encoding block, to form the first reconstructed pixel set comprises:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set comprises:

selecting the second pixel quantity of target reconstructed pixels from adjacent reconstructed pixels in the first direction of the current encoding block according to the second pixel quantity, to form the second reconstructed pixel set, the second pixel quantity being less than a pixel quantity of the current encoding block in the second direction.

15. A non-transitory computer-readable storage medium, the computer-readable storage medium storing a plurality of computer programs, the computer programs, when executed by a processor of a computer device, causing the computer device to perform a plurality of operations including:

obtaining a current encoding block to be encoded in a current video frame, the current encoding block having a width and a height that is different from the width;

determining, within the current video frame, target reference pixels corresponding to the current encoding block, a target quantity corresponding to the target reference pixels being the e-th power of one of the width and the height of the encoding block under a target numeral system, e being a positive integer, the target numeral system being a numeral system used for calculating a predicted value of the current encoding block;

obtaining a predicted value corresponding to the current encoding block according to the target reference pixels; and performing video encoding on the current encoding block according to the predicted value, to obtain encoded data.

16. The non-transitory computer-readable storage medium according to claim 15, wherein the obtaining a predicted value corresponding to the current encoding block according to the target reference pixels comprises:

performing a summation operation on pixel values of the target reference pixels, to obtain a pixel statistical value; and obtaining a shift bit number according to the target quantity, performing shift calculation on the pixel statistical value according to the shift bit number, to obtain a shift result of the pixel statistical value, and obtaining the predicted value corresponding to the current encoding block according to the shift result.

17. The non-transitory computer-readable storage medium according to claim 15, wherein the determining, within the current video frame, target reference pixels corresponding to the current encoding block comprises:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block; and using reconstructed pixels in the first reconstructed pixel set and the second reconstructed pixel set as the target reference pixels, a sum of a quantity of reconstructed pixels in the first reconstructed pixel set and a quantity of reconstructed pixels in the second reconstructed pixel set being equal to the target quantity.

18. The non-transitory computer-readable storage medium according to claim 15, wherein the determining, within the current video frame, target reference pixels corresponding to the current encoding block comprises:

obtaining a first reconstructed pixel set in a first direction and a second reconstructed pixel set in a second direction that correspond to the current encoding block, wherein the first direction is one of the width and the height of the current encoding block and the second direction is the other one of the width and the height of the current encoding block;

obtaining a duplicate pixel set according to at least one of the first reconstructed pixel set and the second reconstructed pixel set, a sum of a quantity of pixels in the first reconstructed pixel set, a quantity of pixels in the second reconstructed pixel set, and a quantity of pixels in the duplicate pixel set being equal to the target quantity; and using reconstructed pixels in the first reconstructed pixel set, the second reconstructed pixel set, and the duplicate pixel set as the target reference pixels.

19. The non-transitory computer-readable storage medium according to claim 17, wherein the obtaining a first reconstructed pixel set in a first direction and a second reconstructed pixel set in a second direction that correspond to the current encoding block comprises:

using a length of the current encoding block in the first direction or the second direction as a target length;

determining a first pixel quantity and a second pixel quantity according to the target length, a sum of the first pixel quantity and the second pixel quantity being equal to the target quantity;

selecting the first pixel quantity of target reconstructed pixels from reconstructed pixels in the first direction of the current encoding block, to form the first reconstructed pixel set; and selecting the second pixel quantity of target reconstructed pixels in the second direction of the current encoding block, to form the second reconstructed pixel set.

20. The non-transitory computer-readable storage medium according to claim 19, wherein the using a length of the current encoding block in the first direction or the second direction as a target length comprises:

using the length of the current encoding block in the first direction as the target length in a case that the length of the current encoding block in the first direction is greater than the length in the second direction; and the selecting the first pixel quantity of target reconstructed pixels from reconstructed pixels in the first direction of the current encoding block, to form the first reconstructed pixel set comprises:

selecting the first pixel quantity of target reconstructed pixels from adjacent reconstructed pixels in the first direction of the current encoding block, to form the first reconstructed pixel set, a length corresponding to the first pixel quantity of pixels being less than or equal to the target length; and the selecting the second pixel quantity of target reconstructed pixels in the second direction of the current encoding block, to form the second reconstructed pixel set comprises:

selecting adjacent reconstructed pixels and non-adjacent reconstructed pixels in the second direction of the current encoding block according to the second pixel quantity, and using the selected reconstructed pixels as the target reconstructed pixels, to form the second reconstructed pixel set, the second pixel quantity being greater than or equal to a pixel quantity of the current encoding block in the second direction.

* * * * *